United States Patent
Ezra et al.

[11] Patent Number: 6,061,489
[45] Date of Patent: *May 9, 2000

[54] LIGHT SOURCE AND DISPLAY

[75] Inventors: David Ezra; Graham John Woodgate; Basil Arthur Omar, all of Oxfordshire, United Kingdom

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/546,510

[22] Filed: Oct. 20, 1995

[30] Foreign Application Priority Data

Oct. 12, 1994 [GB] United Kingdom ................. 9421278

[51] Int. Cl.$^7$ .......................................... G02B 6/00
[52] U.S. Cl. ....................... 385/115; 385/146; 385/901; 385/31; 362/551; 313/115
[58] Field of Search ................... 385/115, 116, 385/146, 147, 901.89, 34, 31; 359/599; 362/31, 551, 552; 349/97, 62, 63, 61; 313/111, 113, 114, 115, 116

[56] References Cited

U.S. PATENT DOCUMENTS

| | | | |
|---|---|---|---|
| 2,550,350 | 4/1951 | Henson | 88/57 |
| 4,306,716 | 12/1981 | James et al. | 463/31 |
| 4,330,813 | 5/1982 | Deutsch | 362/97 |
| 4,759,603 | 7/1988 | Jones | 385/132 |
| 4,948,214 | 8/1990 | Hamblen | 350/413 |
| 4,954,891 | 9/1990 | Burk et al. | 358/101 |
| 5,046,805 | 9/1991 | Simon | 385/31 |
| 5,057,974 | 10/1991 | Mizoue | 362/26 |
| 5,079,473 | 1/1992 | Waymouth | 313/112 |
| 5,083,199 | 1/1992 | Borner | 358/88 |
| 5,121,983 | 6/1992 | Lee | 353/8 |
| 5,132,839 | 7/1992 | Travis | 359/462 |
| 5,302,989 | 4/1994 | Seiichi et al. | 355/22 |
| 5,462,700 | 10/1995 | Beeson et al. | 385/146 |
| 5,481,385 | 1/1996 | Zimmerman et al. | 349/62 |
| 5,521,726 | 5/1996 | Zimmerman et al. | 349/96 |
| 5,550,676 | 8/1996 | Ohe et al. | 359/599 |

FOREIGN PATENT DOCUMENTS

| | | |
|---|---|---|
| 0189233 | 7/1986 | European Pat. Off. . |
| 0262955 | 4/1988 | European Pat. Off. . |
| 0271956 | 6/1988 | European Pat. Off. . |
| 0316465 | 5/1989 | European Pat. Off. . |
| 0354851 | 2/1990 | European Pat. Off. . |
| 0372568 | 6/1990 | European Pat. Off. . |
| 0404289 | 12/1990 | European Pat. Off. . |
| 0491662 | 6/1992 | European Pat. Off. . |
| 0508824 | 10/1992 | European Pat. Off. . |
| 0540140 | 5/1993 | European Pat. Off. . |
| 0570179 | 11/1993 | European Pat. Off. . |
| 0576106 | 12/1993 | European Pat. Off. . |
| 0602934 | 6/1994 | European Pat. Off. . |
| 4004739 | 8/1991 | Germany . |
| 4309667 | 9/1994 | Germany . |
| 58-169130 | 10/1983 | Japan . |
| 61-113389 | 5/1986 | Japan . |
| 5-127025 | 5/1993 | Japan ................. 349/61 |

(List continued on next page.)

OTHER PUBLICATIONS

Pastoor et al, "Subjective Assessments of the Resolution of Viewing Directions . . . ", SID, vol. 30/3, 1989, pp. 217–223.
Akiyama et al, "Three–Dimensional Visual Communication SS–6", NTT Human Interface Labs., ITEC '91, pp. 607–610.

*Primary Examiner*—Hemang Sanghavi
*Attorney, Agent, or Firm*—Renner, Otto, Boisselle & Sklar

[57] ABSTRACT

A light source comprises an array of contiguous transparent blocks, each of which contains a light emitter such as a cold cathode fluorescent tube. The blocks have a transparent front surface which may be optically diffusing, the other surfaces being coated with a thin optically reflective layer so that each block acts as a light guide. The tubes are independently controllable, for instance so as to simulate a moving light source which may be controlled so as to track the position of an observer of a 3D display.

21 Claims, 31 Drawing Sheets

FOREIGN PATENT DOCUMENTS

| | | |
|---|---|---|
| 2206763 | 1/1989 | United Kingdom . |
| 2267579 | 12/1993 | United Kingdom . |
| 2273577 | 6/1994 | United Kingdom . |
| 2284487 | 6/1995 | United Kingdom . |
| 8302169 | 6/1983 | WIPO . |
| 9319394 | 9/1993 | WIPO . |

Heater pad

Diffusing surface

Cavity for light source

Perspex block

Mirrored sides and base

Perspex wedge

Light sources

Optical diffuser

20 Diffuser

Light source

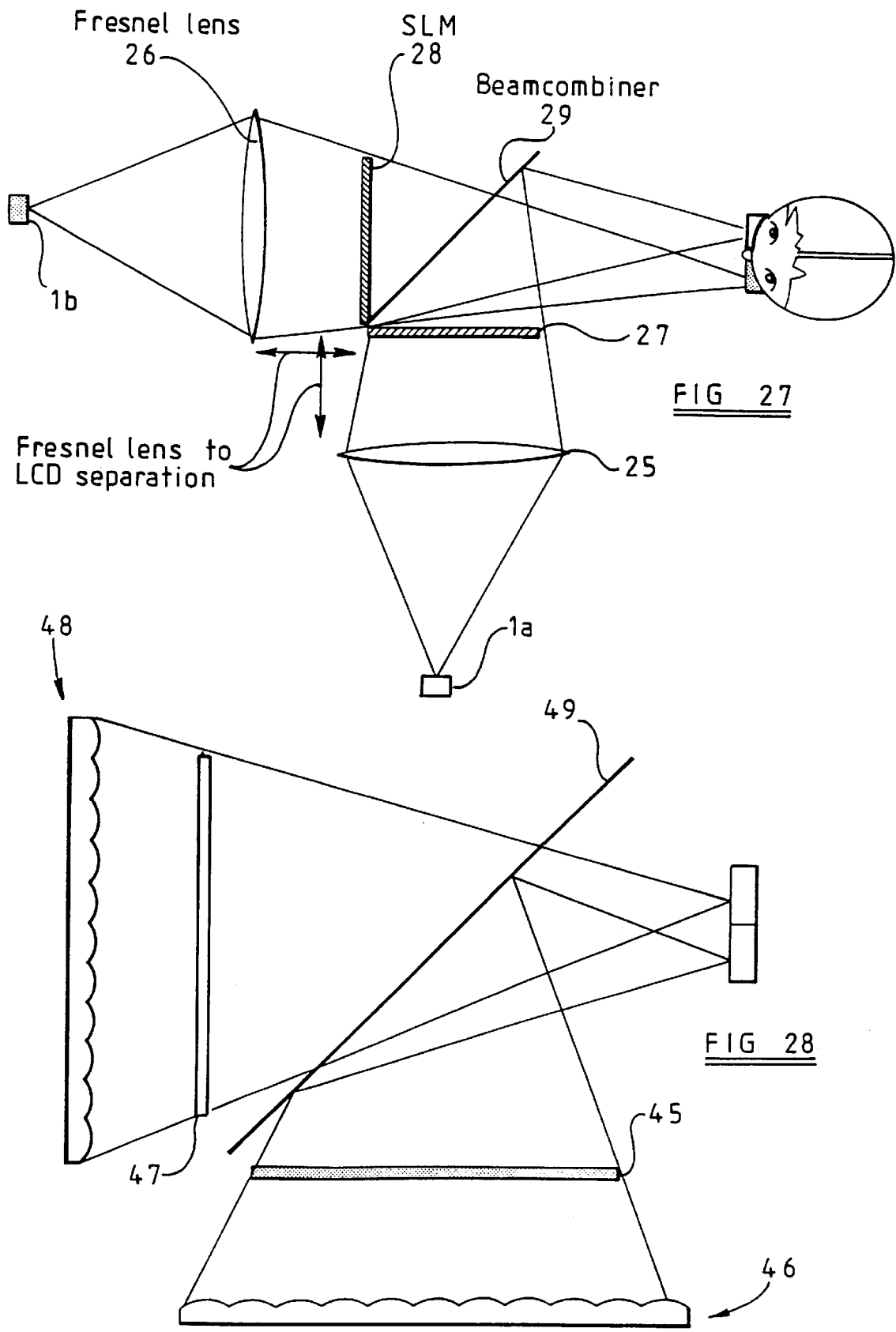

6 O'clock panel

12 O'clock panel

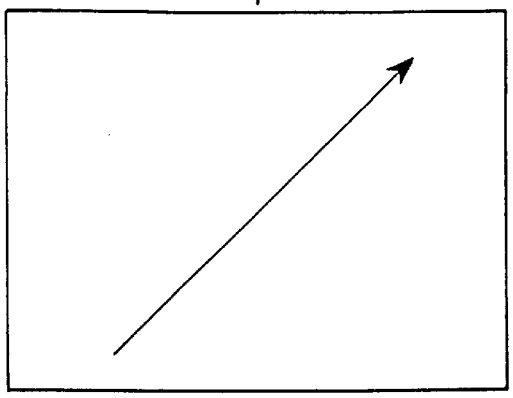
FIG 31b
6 O'clock panel
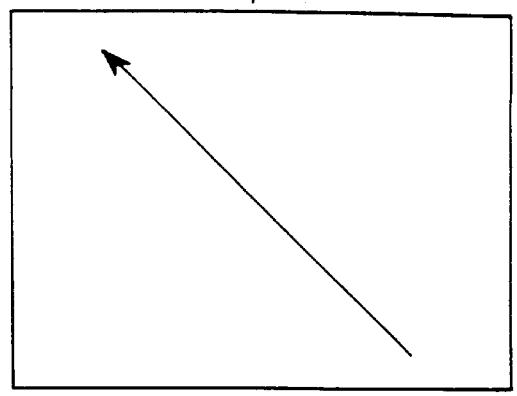
FIG 31a
12 O'clock panel
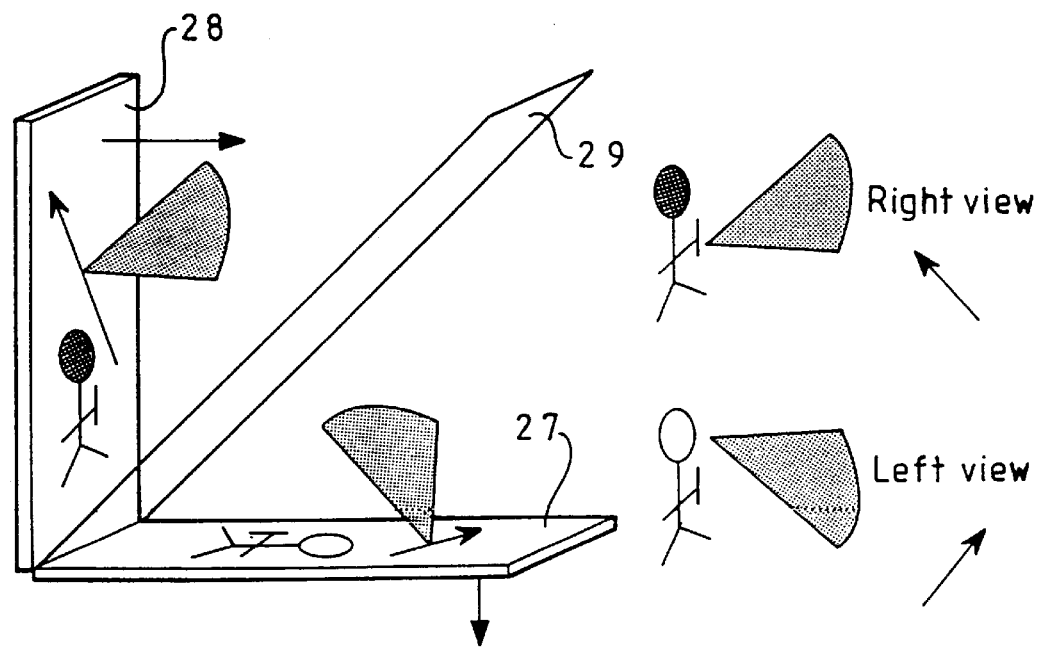
FIG 32
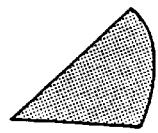  12 O'clock
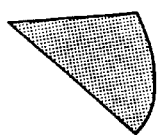  6 O'clock
→ Normal direction of light transmission
→ Polarisation direction at panel output

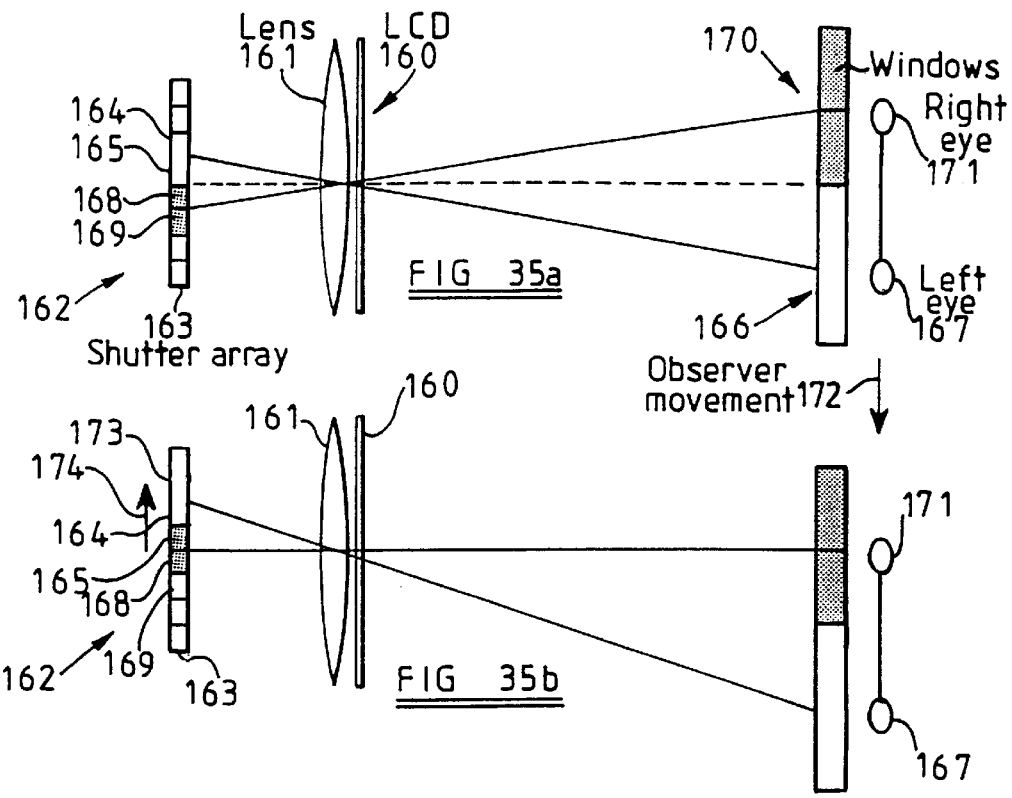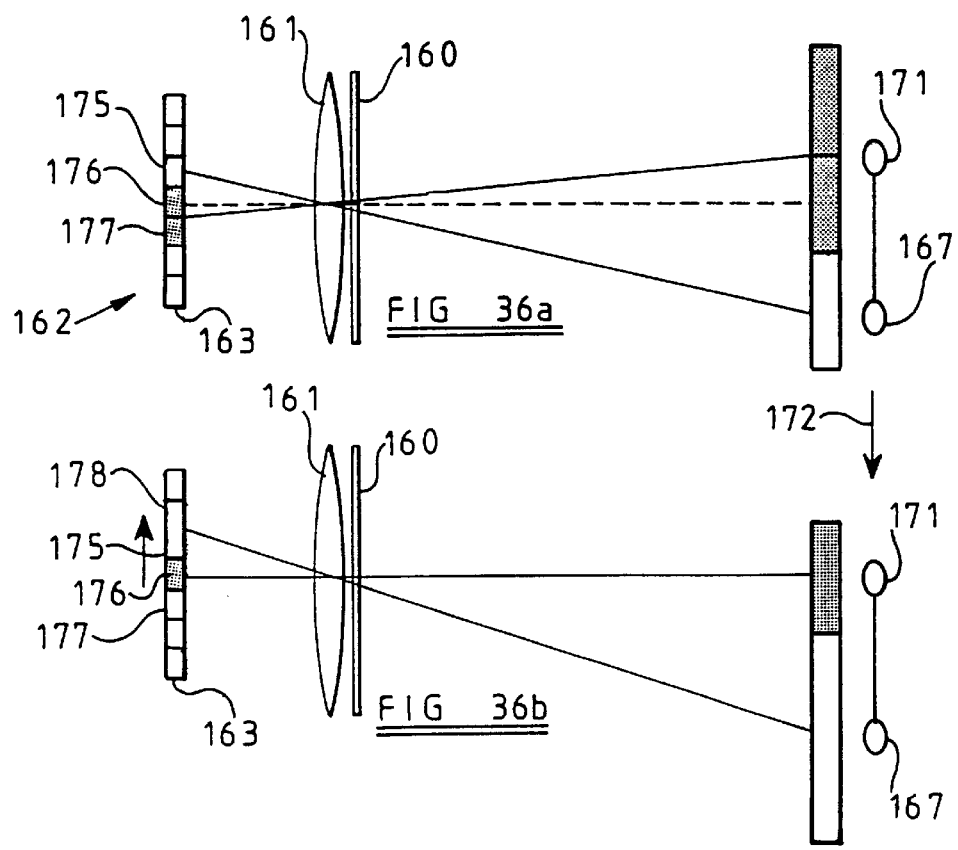

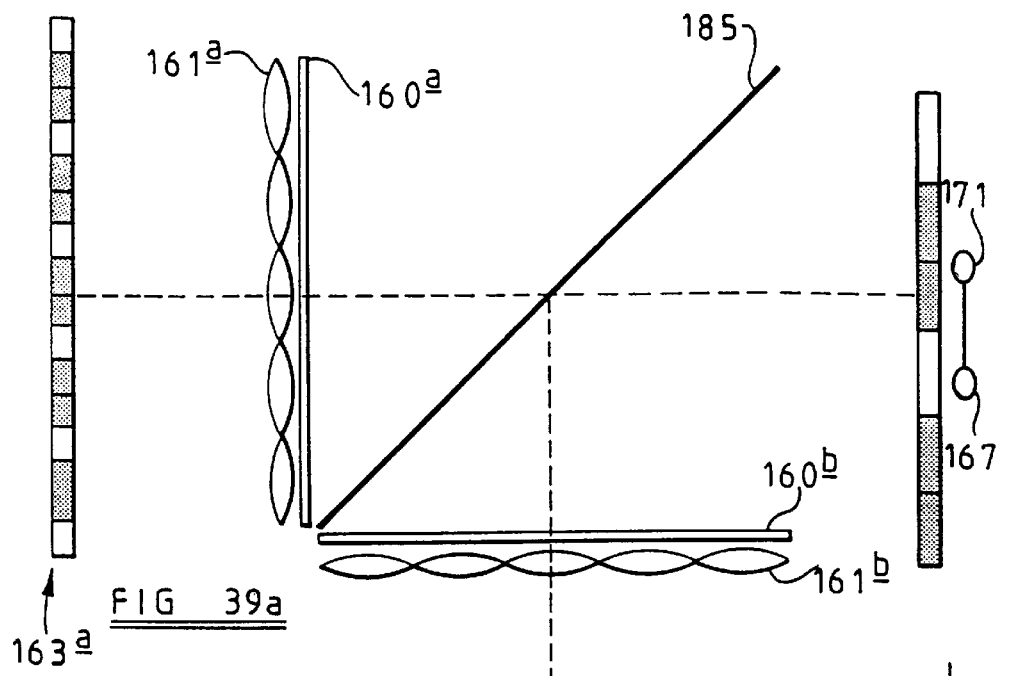
FIG 39a
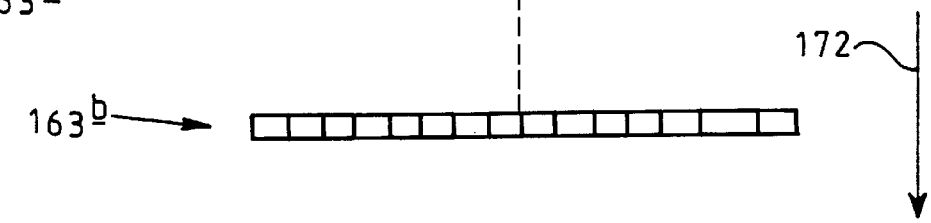
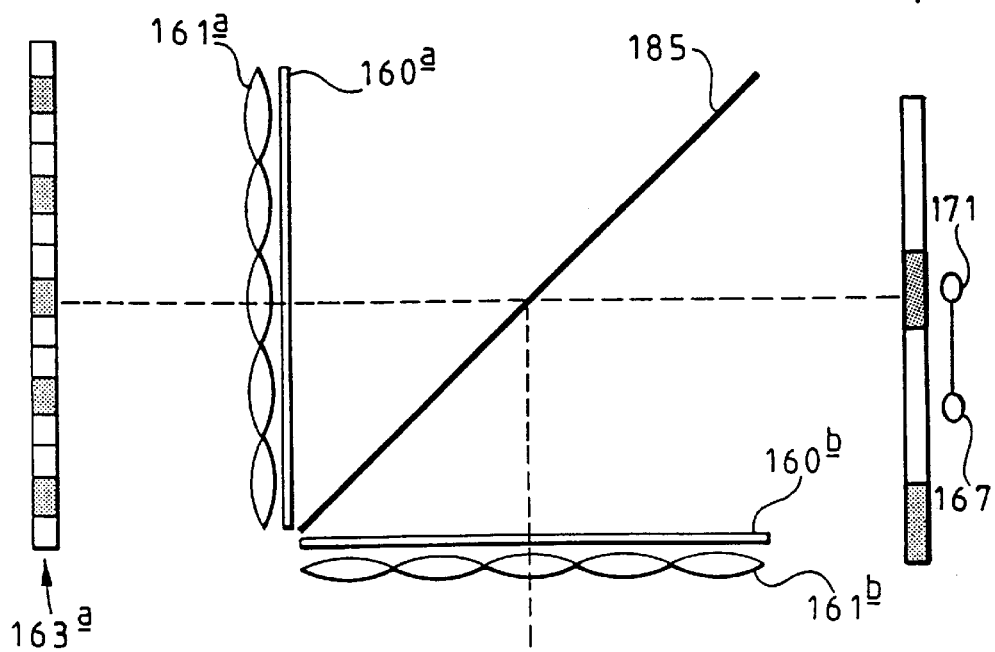
FIG 39b
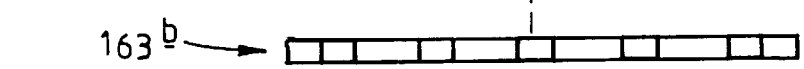

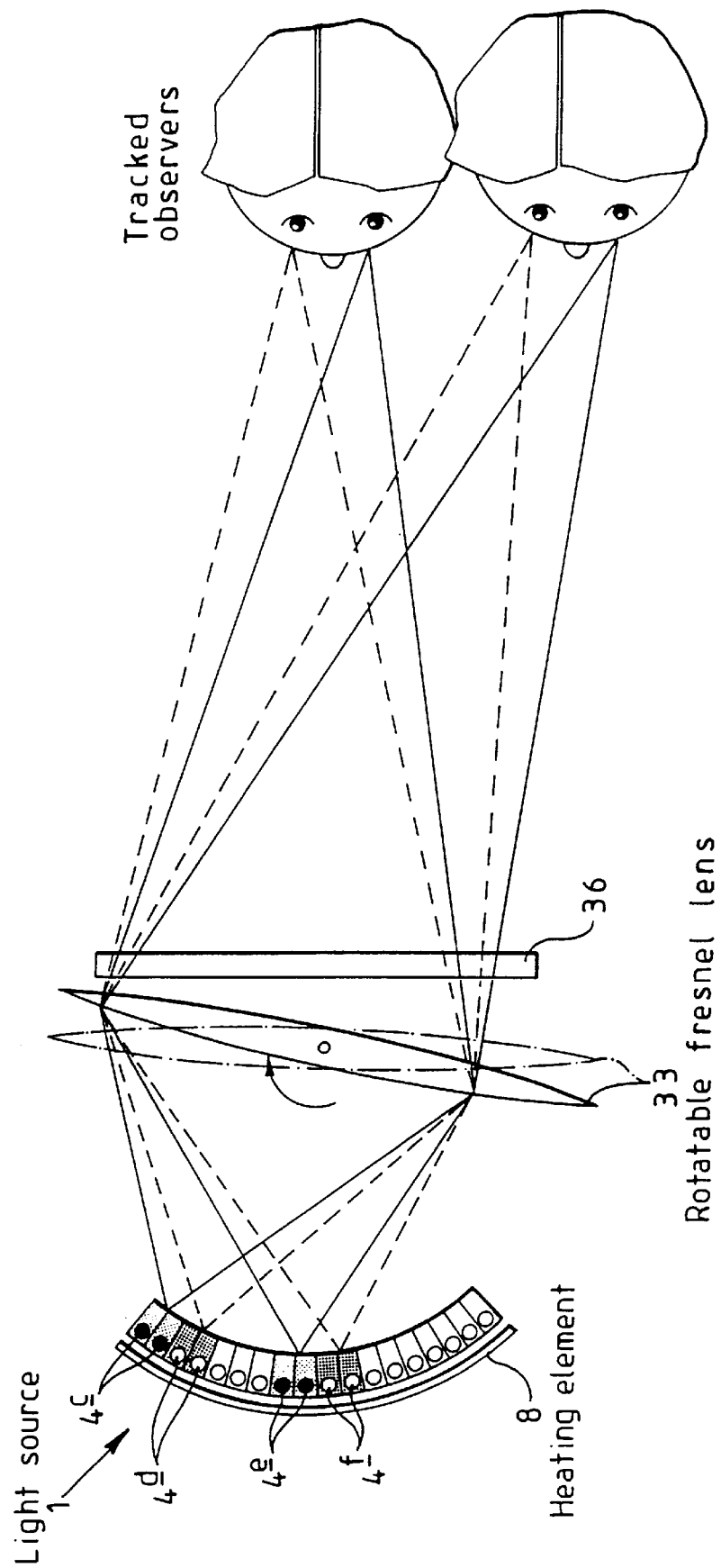

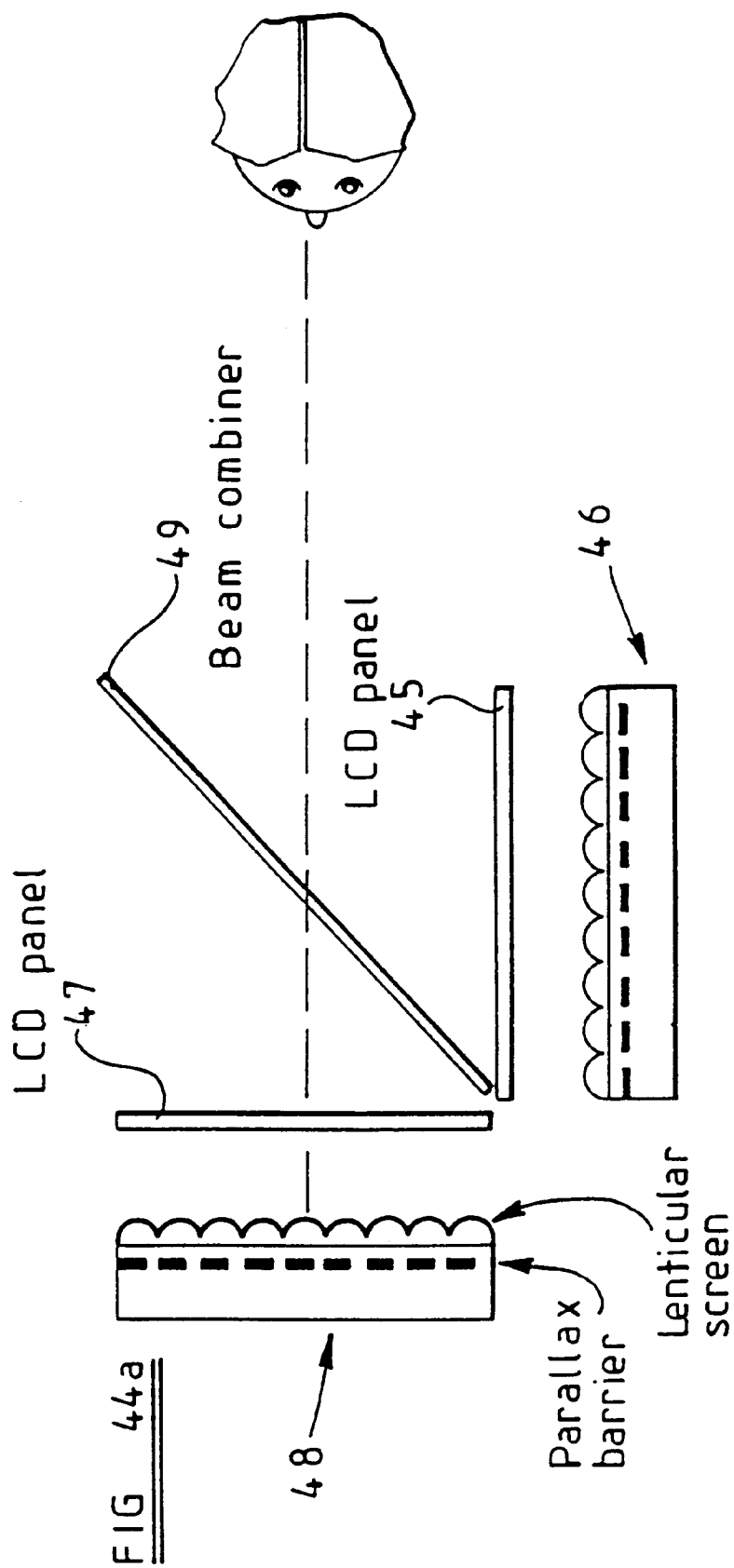

LIGHT SOURCE AND DISPLAY

The present invention relates to light sources and displays.

EP 0540 140 describes a back light which is intended to provide a substantially constant level of illumination, providing a high illumination intensity for day time viewing and a relatively low intensity for night time viewing.

EP 0491 662 discloses a display including a back light having a face plate to produce a magnified image of the display in order to hide the gaps between adjacent parts of the display. The face plate uses fibre optic light guides in order to provide the magnified image.

U.S. Pat. No. 5,057,974 describes a back light for producing uniform illumination of a liquid crystal display. The back light comprises an array of fluorescent tubes disposed within a flat acrylic plate, the rear surface of which is provided with a reflector including minute concavities and convexities. The arrangement of concavities and convexities varies with the distance from the fluorescent tubes.

A flat light guide is described in U.S. Pat. No. 4,954,891 which is arranged to conduct light from fluorescent tubes to form a strip illuminator.

U.S. Pat. No. 4,948,214 describes an illumination arrangement for an optical scanner, the arrangement comprising an array of light sources which are coupled to light guides. The ends of the light guides are not contiguous, an array of lenses being provided and arranged to produce rays of light which may intersect.

A projector is described in EP 0372 568 which employs curved reflectors. A stereoscopic projector is described in U.S. Pat. No. 5,121,983 in which curved reflectors are used in the light condensor of the projector. The curved reflectors in these projectors are not used to image the light source at a viewer location.

GB 2284 487 and GB 2273 577 both describe directional display arrangements including beam combiners. EP 0316 465 describes an autostereoscopic display arrangement. The GB 2273 577 fails to disclose the matching of asymmetric contrast and viewing angle for two or more spatial light modulators.

According to a first aspect of the invention there is provided a light source comprising a plurality of individually controllable light emitting means and a plurality of optical waveguides, each of which is arranged to receive light from a respective one of the light emitting means, the optical waveguides being arranged to substantially prevent the passage of light between adjacent waveguides the optical waveguides having light outputs arranged as an array with adjacent light outputs being contiguous with each other, each of the light emitting means comprising at least one light emitter.

Such an arrangement is advantageous in that the size of any residual gap between the waveguides can be minimized thus reducing the visibility of the gaps to a viewer.

According to a second aspect of the invention there is provided a directional display comprising at least one light source, at least one spatial light modulator, and at least one curved reflector arranged to deflect light from the light source through the at least one spatial light modulator and to form an image of the at least one light source at a viewer location.

The use of such curved mirrors enables the size of the display, in particular the back working distance of the display to be reduced.

According to a third aspect of the invention there is provided a directional display comprising first and second display means and an optical combiner for combining light from the first and second display means, each of the first and second display means comprising a spatial light modulator, an extended light source, an array of apertures in which the pitch of the apertures is greater than twice the aperture width, and a parallax screen for controlling the direction of illumination of the spatial light modulator by light from the apertures.

Such an arrangement permits the prevention of generating of pseudoscopic viewing zones.

According to a fourth aspect of the invention there is provided a display comprising at least one spatial light modulator arranged to be illuminated via a repetitive optical structure, characterised by means for reducing visibility of Moire fringes.

The reduction in the level of Moire fringing effects results in an improvement in the quality of the displayed image.

According to a fifth aspect of the invention there is provided a directional display comprising first and second spatial light modulators for modulating light with first and second image views, respectively, and means for permitting the first and second image views to be visible in first and second directions, respectively, each of the first and second spatial light modulators having a contrast which varies asymmetrically with vertical viewing angle and co-operating with the permitting means to provide contrasts which vary similarly in the first and second directions with respect to vertical viewing angle.

Such an arrangement enables the first and second images to be substantially uniform contrast regardless as to the selected viewing position.

According to a further aspect of the invention there is provided a directional display comprising a light source, a spatial light modulator for modulating the light emitted by the light source, and a lens for imaging said light source at a viewing position, and characterized in that said lens is angularly adjustable.

Such a display is advantageous in that degradation of the viewed image due to the aberrational performance of the lens can be reduced.

Preferred embodiments of the invention are defined in the other appended claims.

The invention will be further described by way of example, with reference to the accompanying drawings, in which:

FIG. 27 is a diagram showing a 3D display constituting a fifteenth embodiment of the invention and including two light sources as shown in FIG. 1;

FIG. 28 is diagram showing a 3D display constituting a sixteenth embodiment of the invention;

Figure 10:
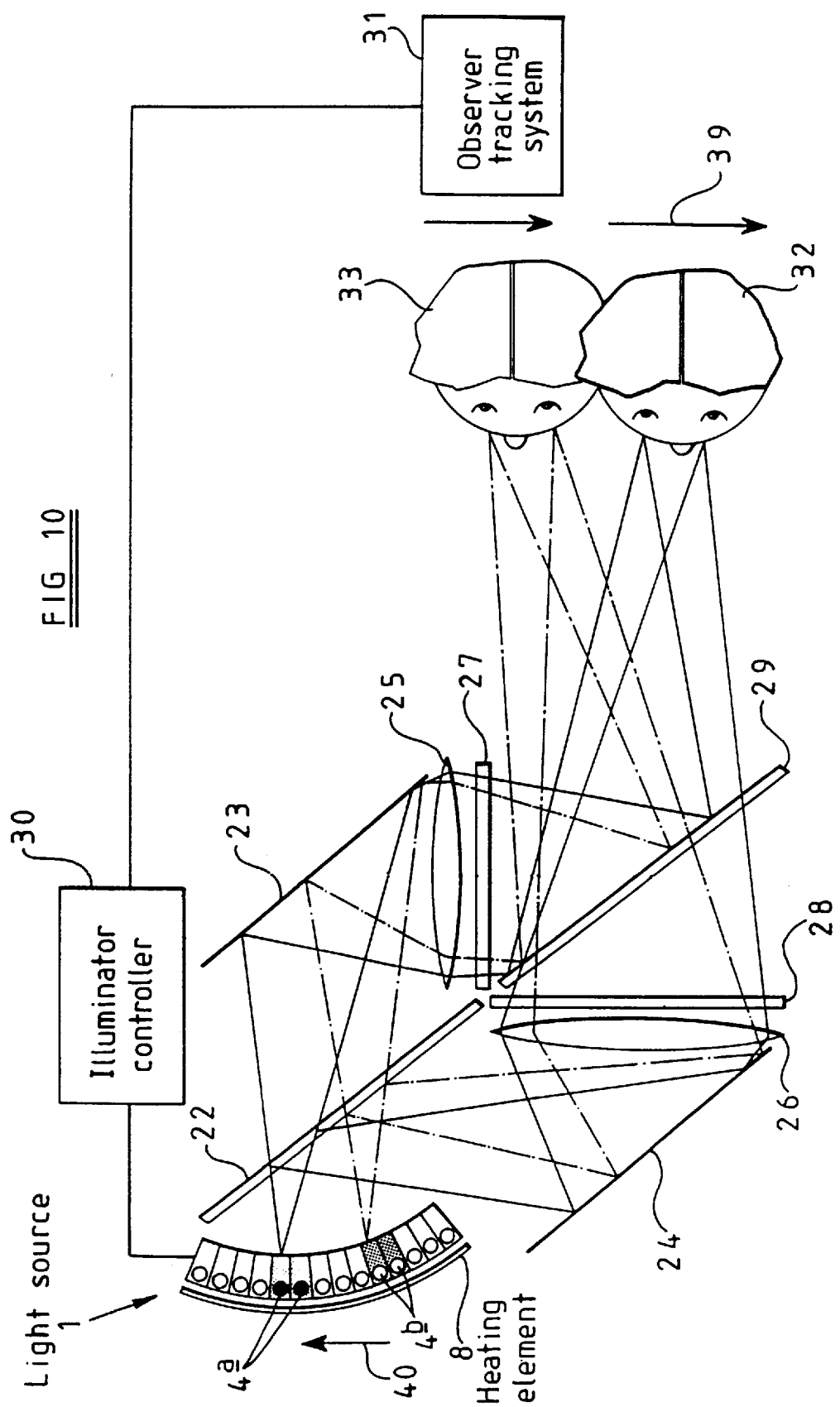
FIG. 10 is a diagram showing a 3D display constituting a sixth embodiment of the invention and including a light source as shown in FIG. 3.
Figure 11:
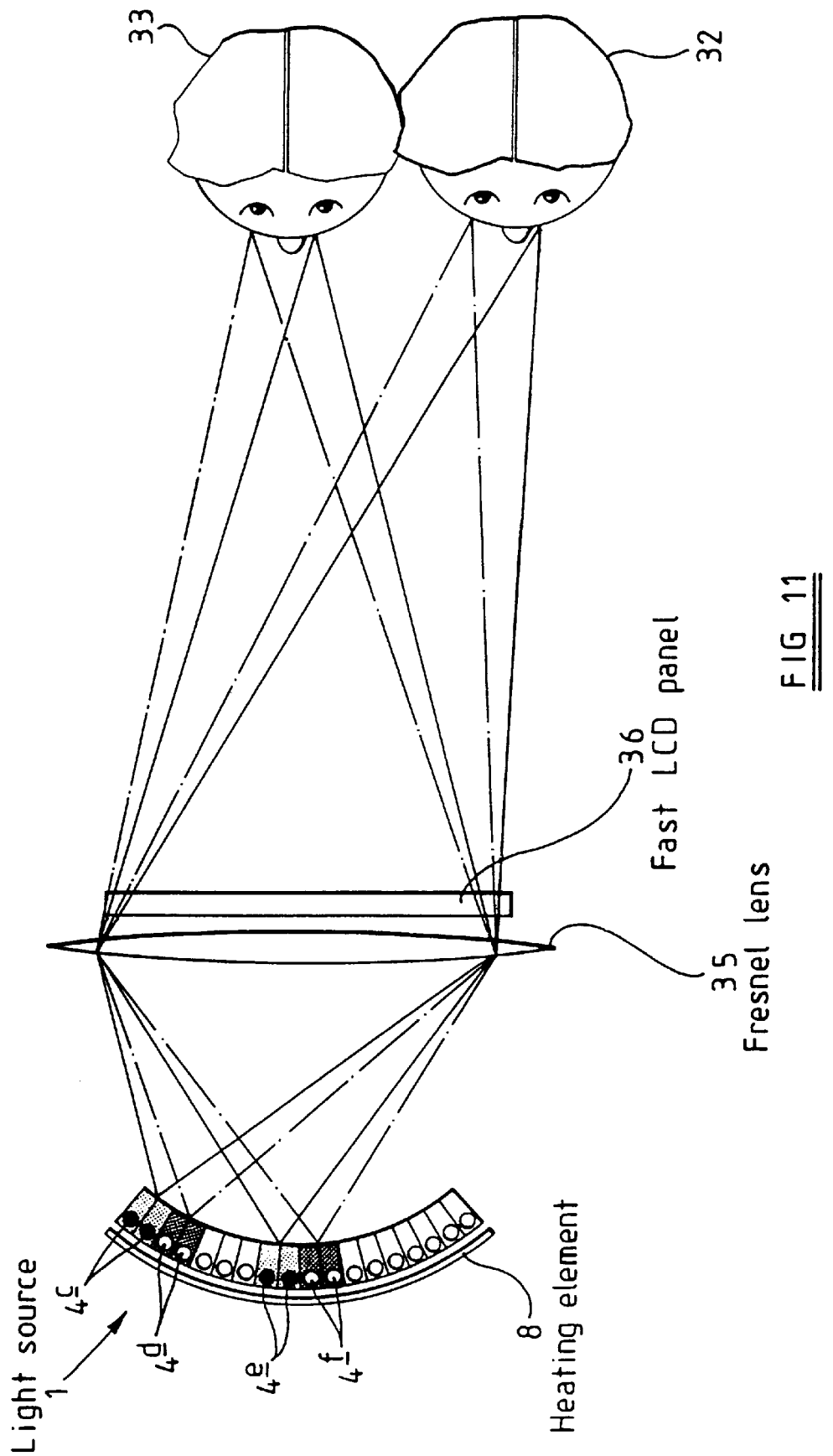
FIG. 11 is a diagram showing a 3D display constituting a seventh embodiment of the invention and including a light source as shown in FIG. 3.
Figure 30B:
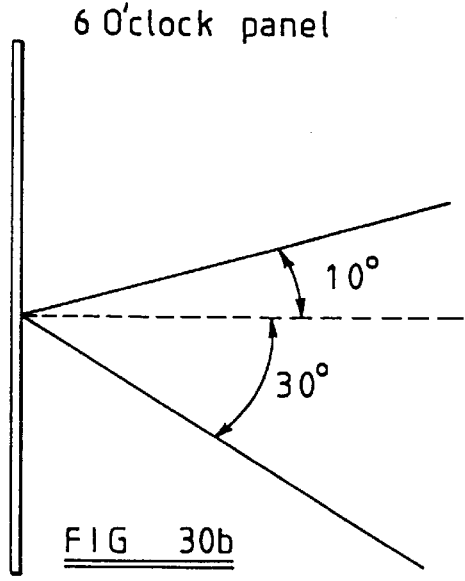
Figure 30A:
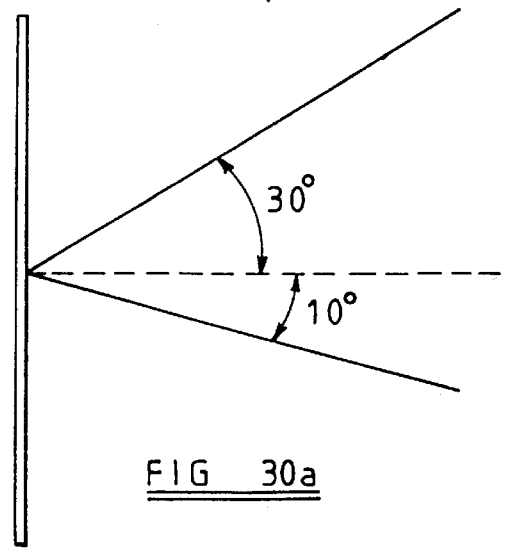
Figures 33A, 33B:
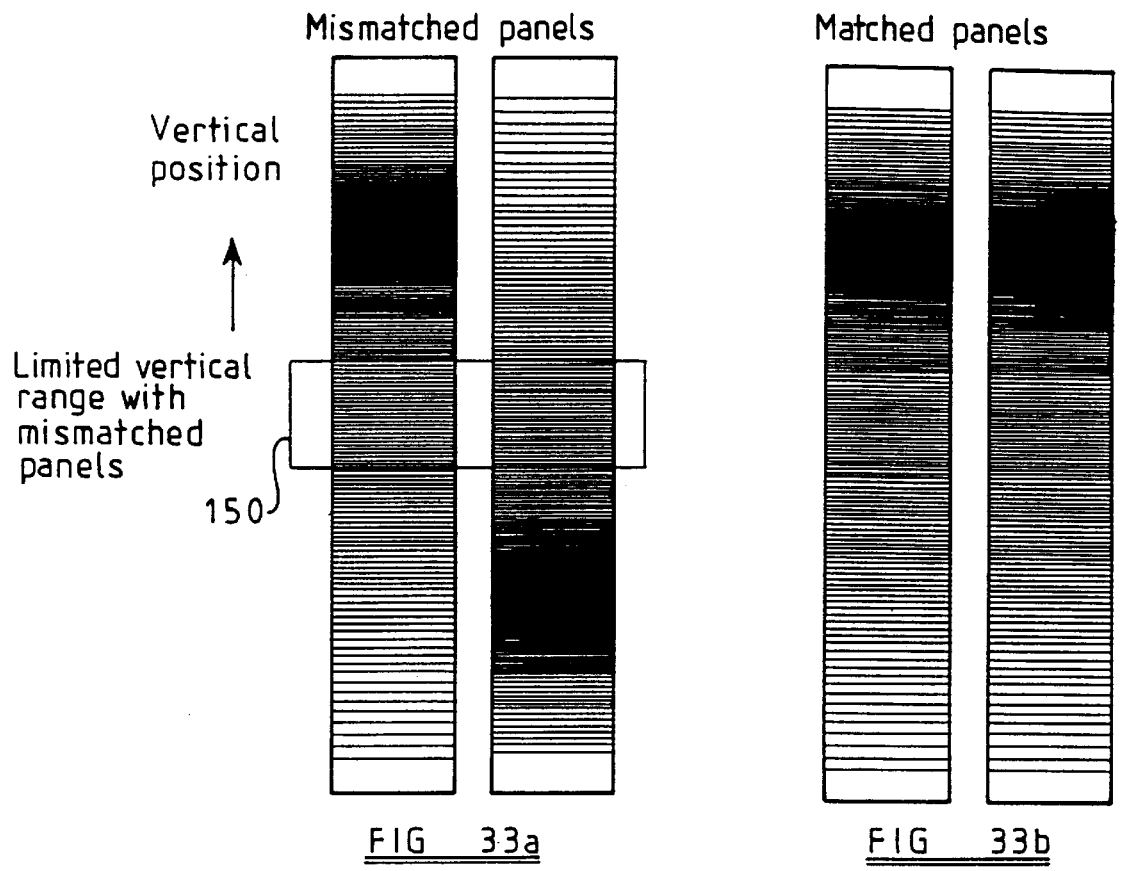
Figure 34:
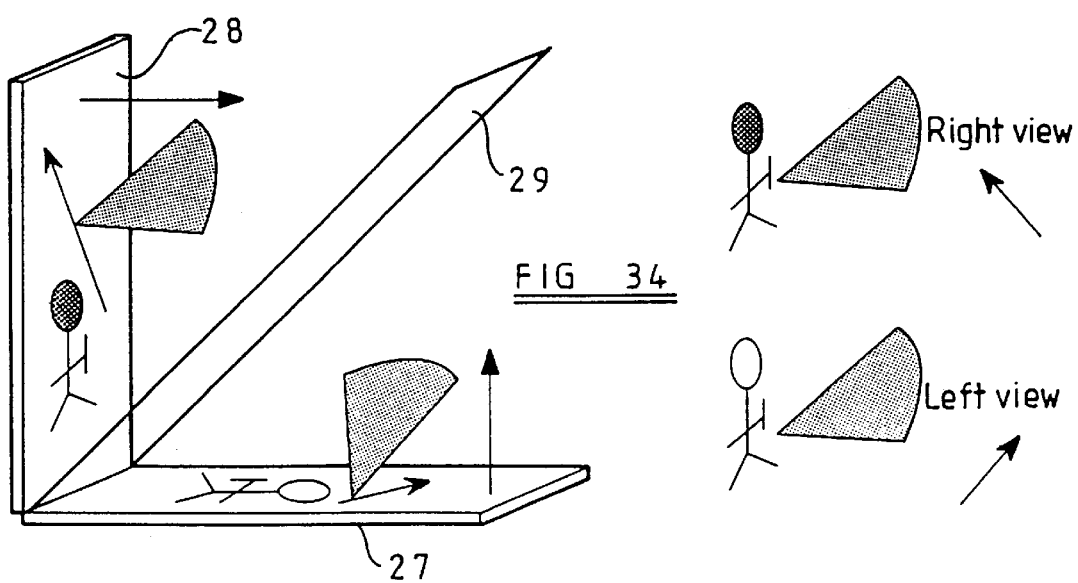
Figure 37A:
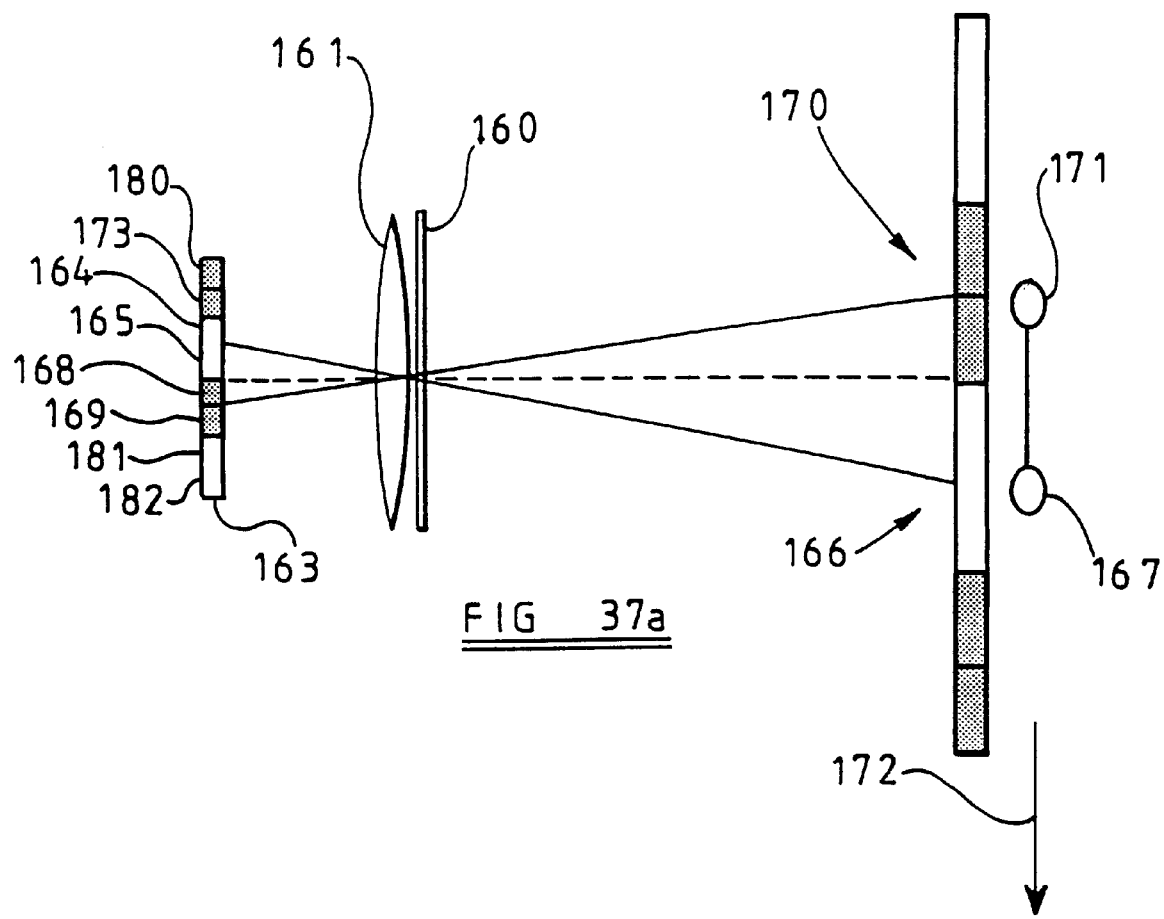
Figure 37B:
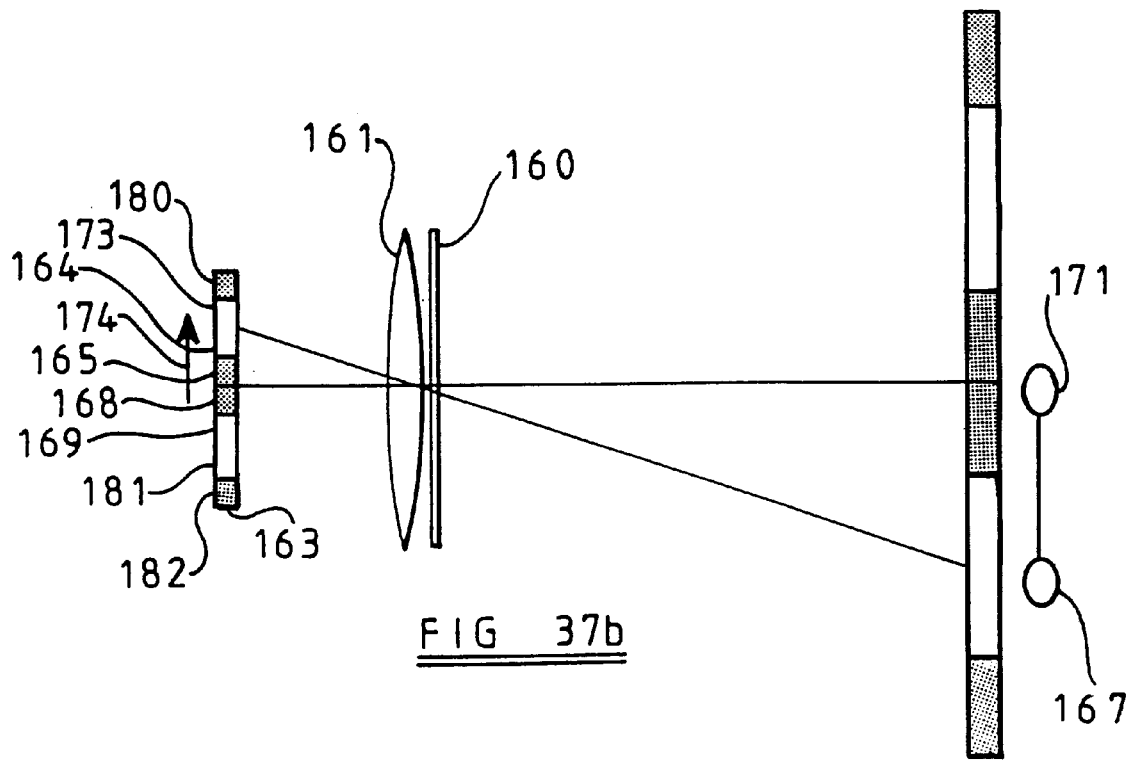
Figure 38A:
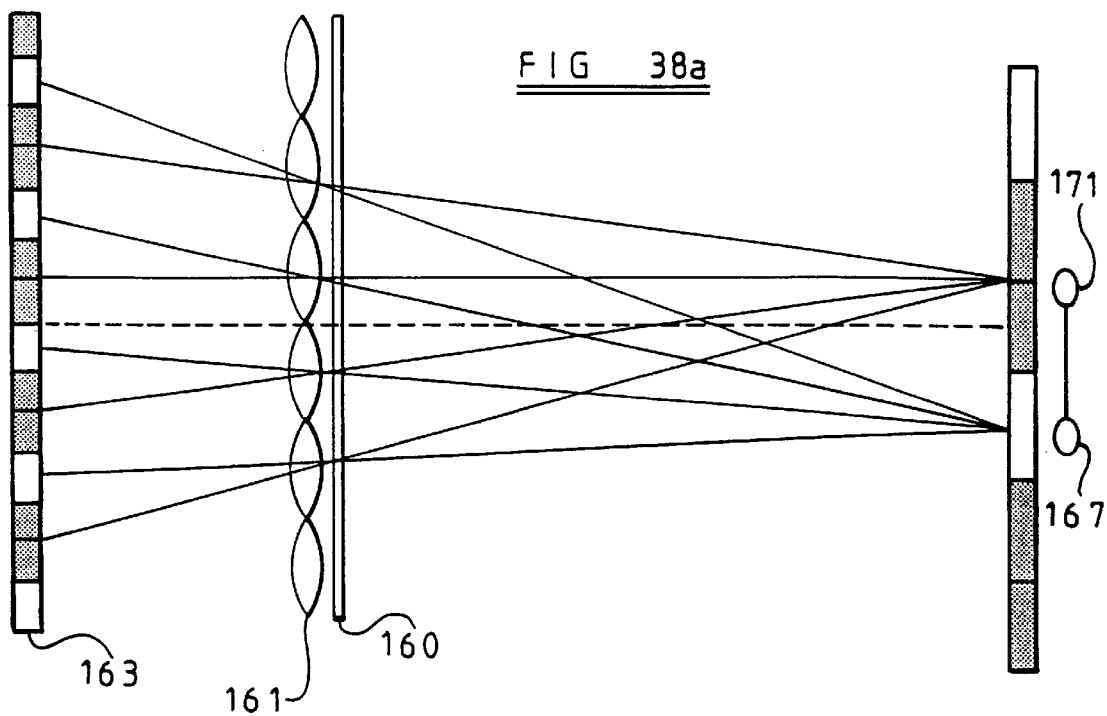
Figure 38B:
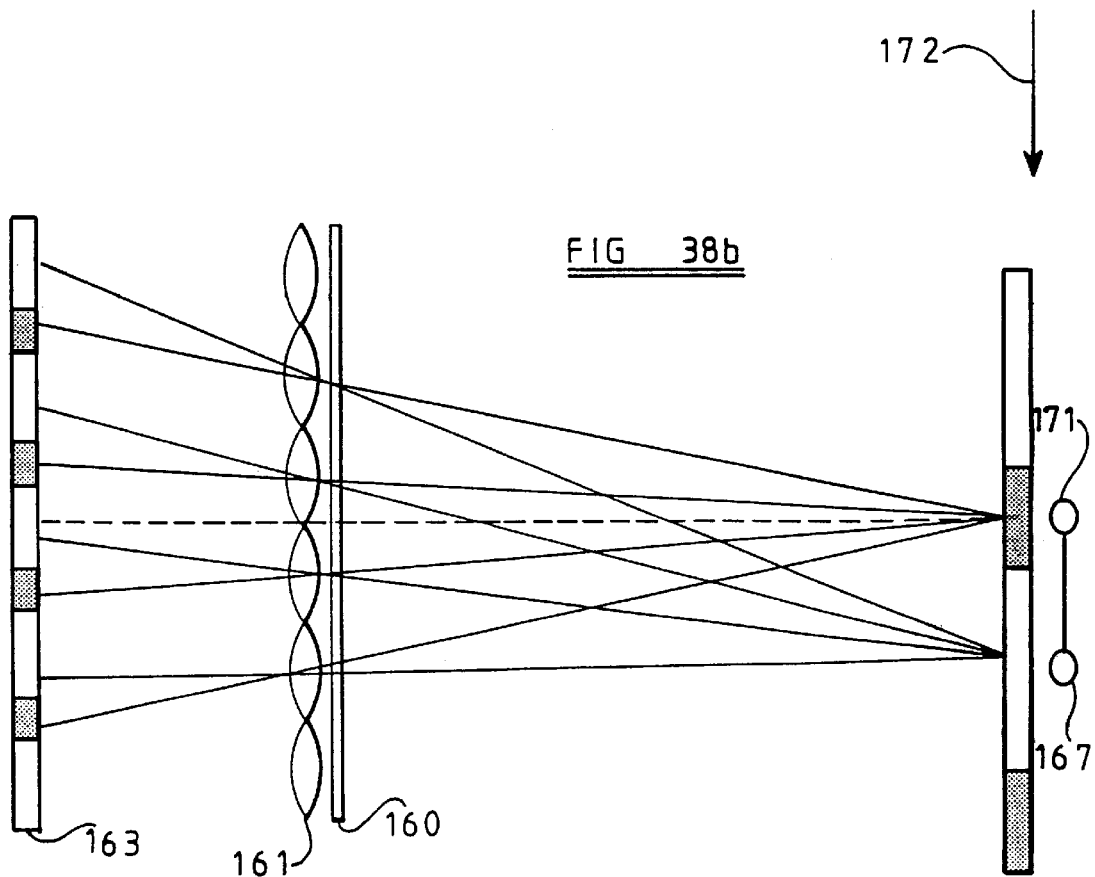
Figure 40A:
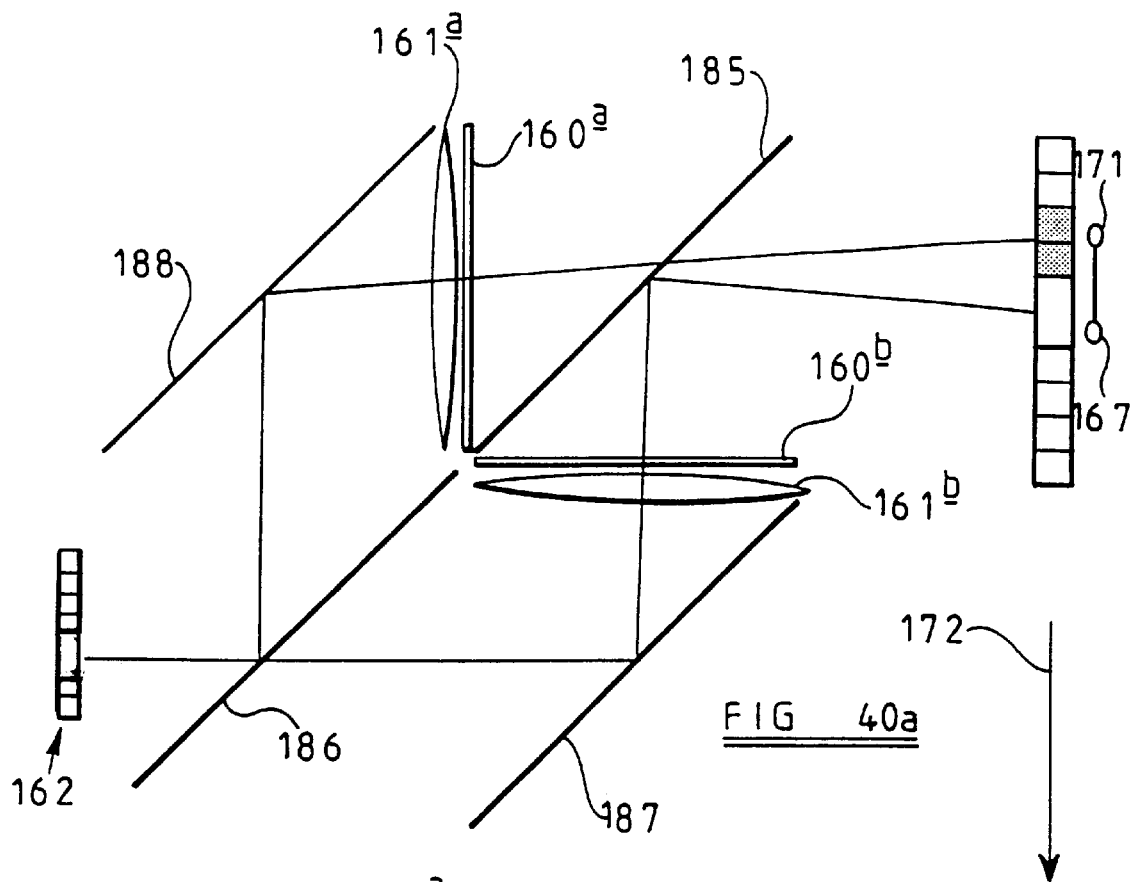
Figure 40B:
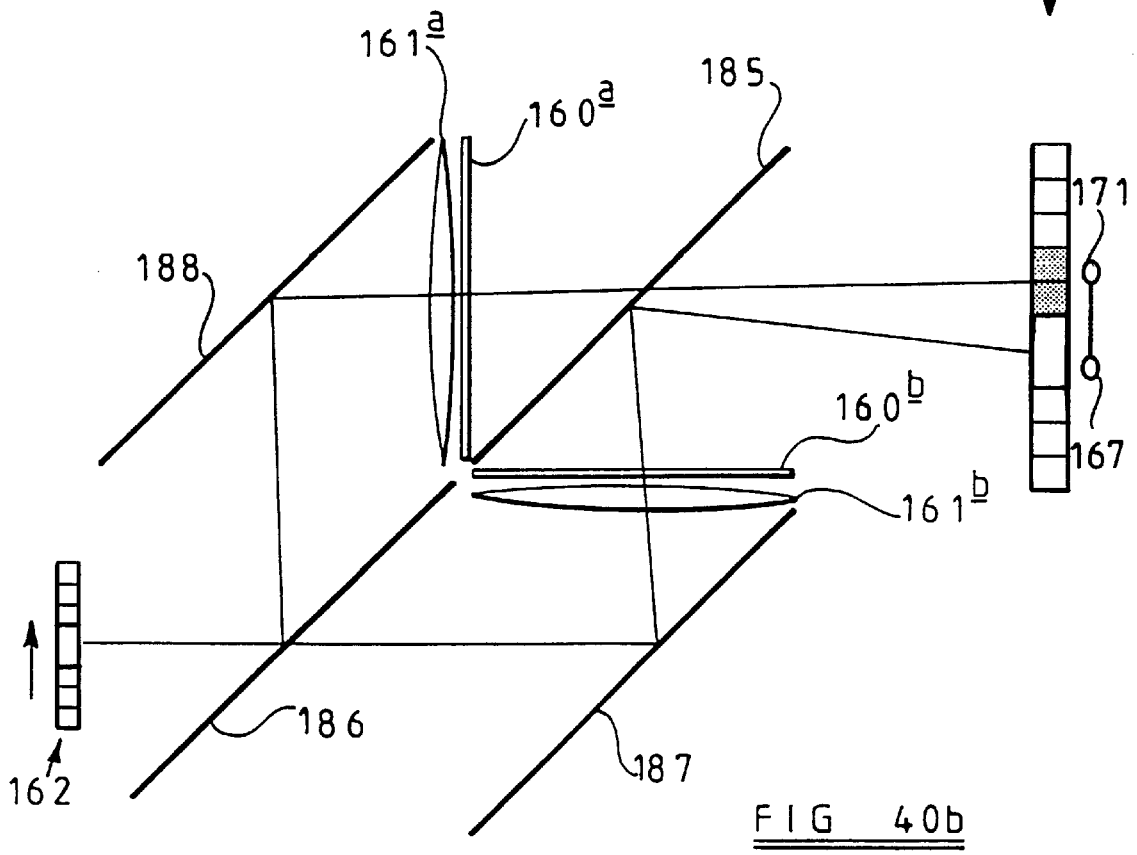
Figure 41:
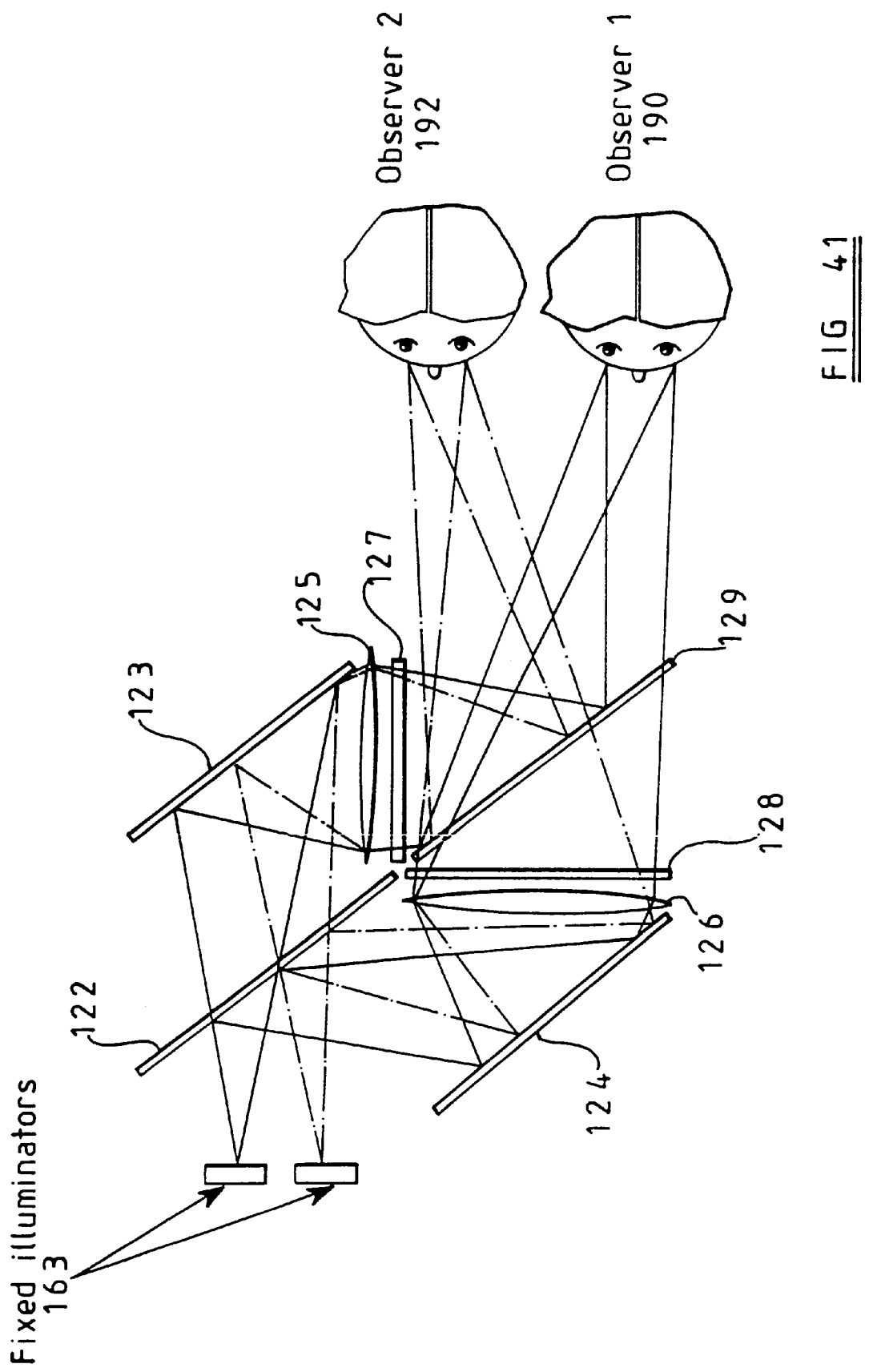
Figure 42A:
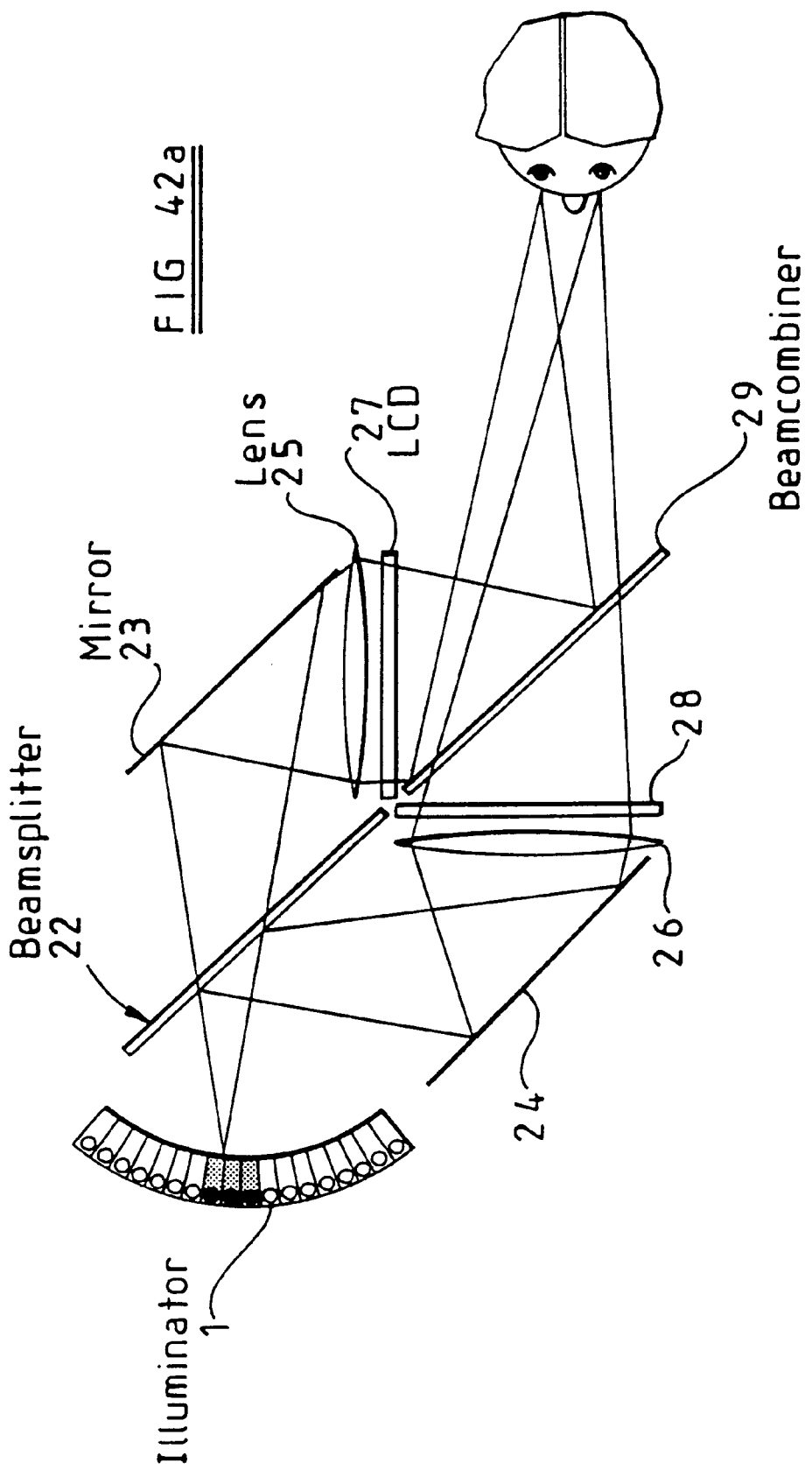
Figure 42B:
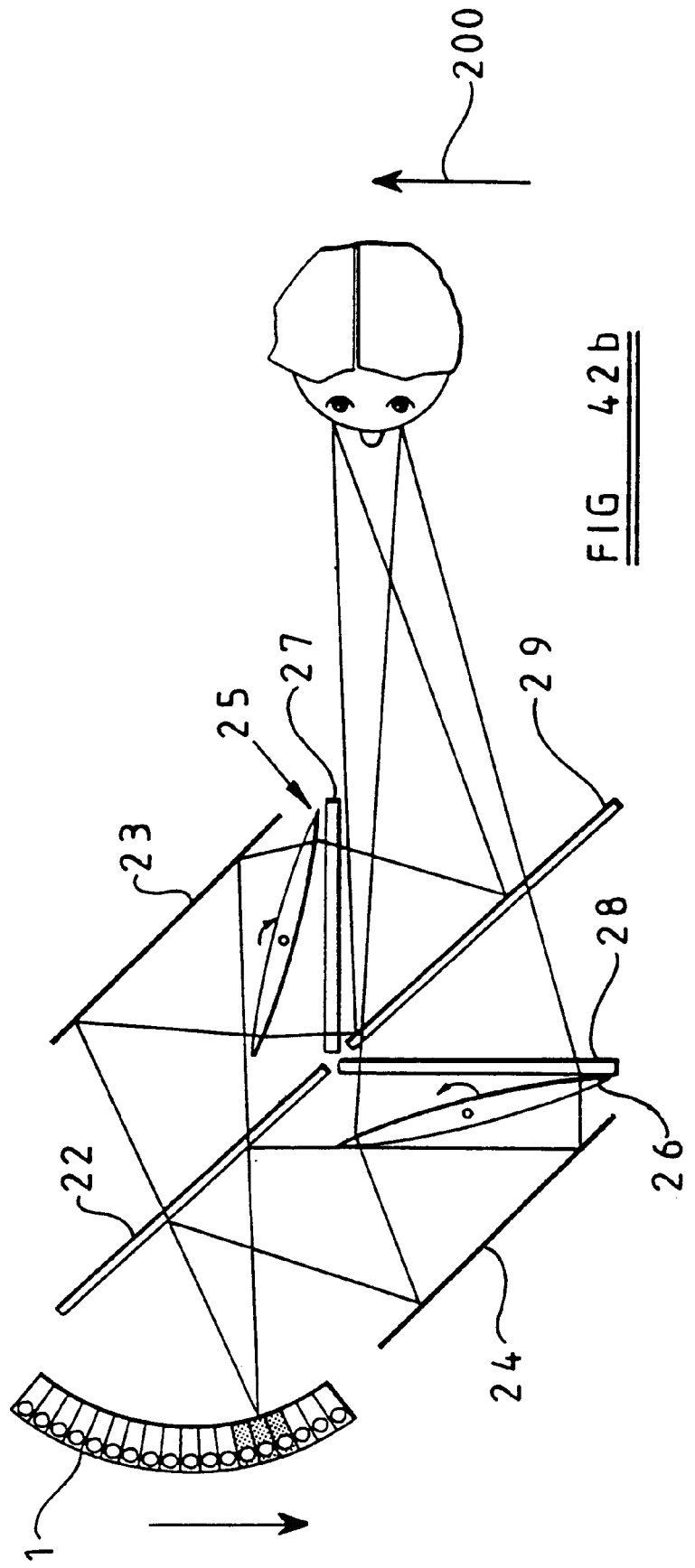
Figure 44B:
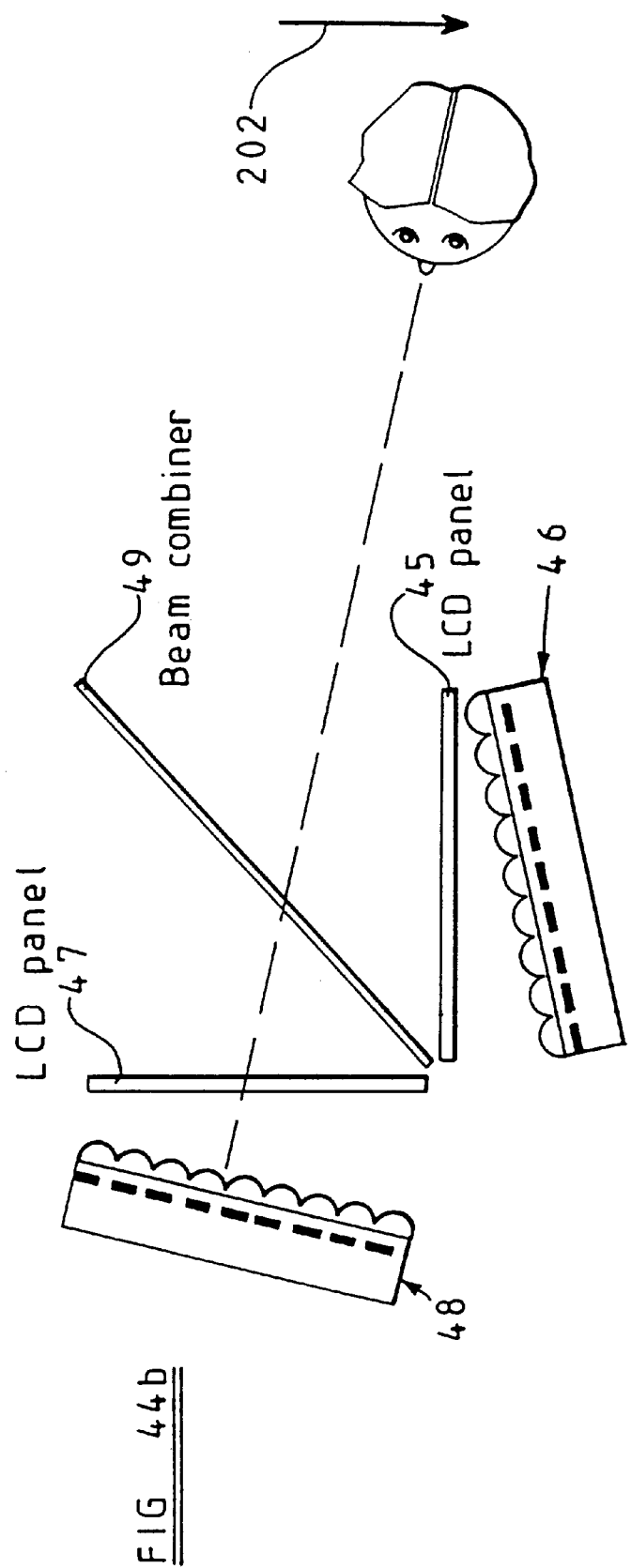
Figure 45:
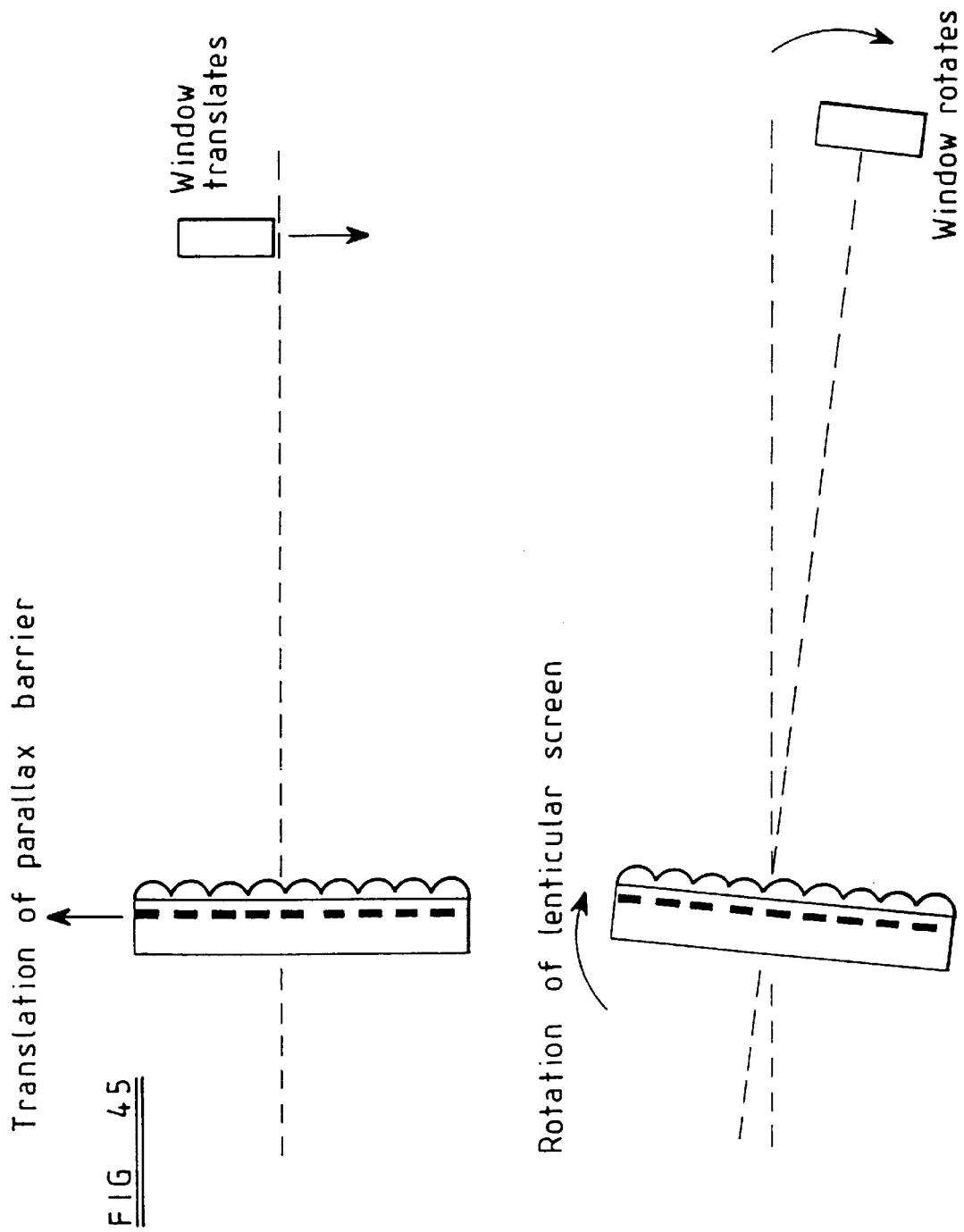

FIGS. 30a and 30b illustrate vertical viewing angles for 12 O'clock and 6 O'clock liquid crystal display panels, respectively;

FIGS. 31a and 31b illustrate output polariser configurations for 12 o'clock and 6 O'clock liquid crystal display panels, respectively;

FIG. 32 is a diagram showing a 3D display having mismatched display panels;

FIGS. 33a and 33b illustrate contrast against vertical viewing angle for mismatched display panels, as shown in FIG. 32, and for matched panels, respectively;

FIG. 34 is a diagram showing a 3D display constituting a seventeenth embodiment of the invention;

FIGS. 35a and 35b are diagrams showing a 3D display constituting an eighteenth embodiment of the invention and illustrating observer tracking;

FIGS. 36a and 36b are diagrams showing a 3D display constituting a nineteenth embodiment of the invention and illustrating observer tracking;

FIGS. 37a and 37b are diagrams showing a 3D display constituting a twentieth embodiment of the invention and illustrating observer tracking;

FIGS. 38a and 38b are diagrams showing a 3D display constituting a twenty first embodiment of the invention and illustrating observer tracking;

FIGS. 39a and 39b are diagrams showing a 3D display constituting a twenty second embodiment of the invention and illustrating observer tracking;

FIGS. 40a and 40b are diagrams showing a 3D display constituting a twenty third embodiment of the invention and illustrating observer tracking;

FIG. 41 is a diagram showing a 3D display constituting a twenty fourth embodiment of the invention;

FIGS. 42a and 42b are diagrammatic views of a modification to the embodiment of FIG. 10;

FIG. 43 is a diagrammatic view of a modification to the embodiment of FIG. 11;

FIGS. 44a and 44b are diagrammatic views of a modification to the embodiment of FIG. 28; and FIG. 45 is a diagrammatic illustration of the operation of the arrangement of FIGS. 44a and 44b.

Figure 1:
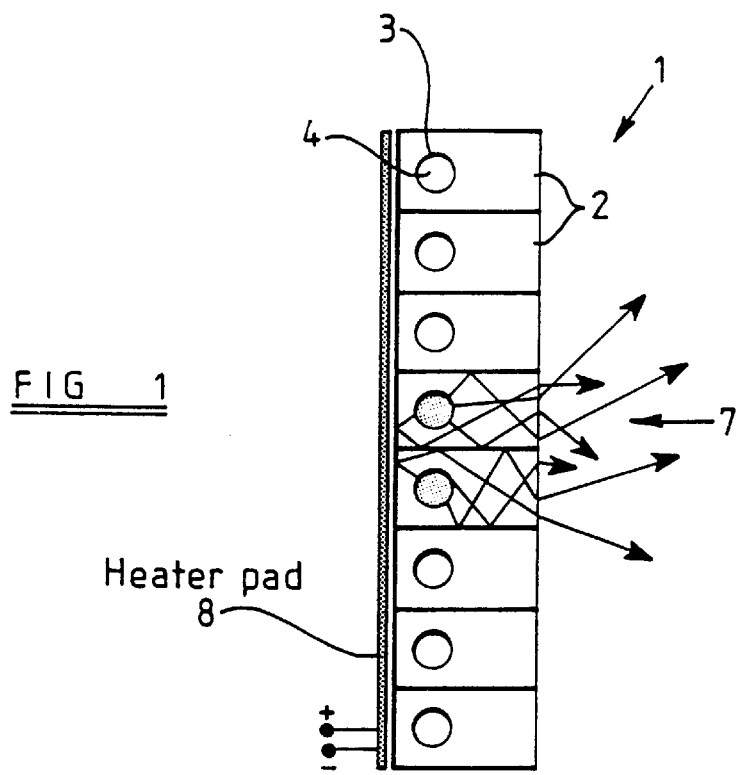
FIG. 1 shows a light source constituting a first embodiment of the invention.

FIG. 1 shows a light source which may be used as part of a three dimensional (3D) display, for instance of the autostereoscopic type. The light source 1 comprises a plurality of optical waveguides 2, one of which is shown in more detail in FIG. 2. Each optical waveguide 2 comprises a cuboidal block of optically transmissive material. The material may comprise glass or a transparent plastics, such as perspex (RTM). Each block 2 has formed therein by drilling or moulding a cylindrical cavity 3 which contains an elongate light source 4, such as a cold cathode fluorescent tube. Other possible light sources include light emitting diodes, lasers such as laser diodes and incandescent light sources, light emitting polymers, luminescence and plasma sources.

Each block 2 has a light-emitting surface 5 shown as an optically diffusing surface formed by roughening the block surface, for instance by sand blasting, although it may comprise a smooth surface covered by a thin optical diffusing layer. The remaining surfaces 6 of the block 2 are optically reflective, for instance as a result of being coated with a thin film of reflective material. The film is preferably less than 100 micrometers thick so that, as shown in FIG. 1, the blocks 2 can be arranged as a linear array with adjacent pairs of blocks abutting against each other with a minimal gap between the surfaces 5 thereof. Thus, the light source 1 comprises a linear array of contiguous light-emitting surfaces.

The arrows 7 in FIG. 1 illustrate various light paths for light generated by the florescent tubes 4 in two of the blocks 2. The reflective surfaces 6 contain the light within each block 2 so that it acts as a waveguide, the light being emitted only from the surface 5. The reflective surfaces 6 therefore cause the light output from each block to be maximised and to prevent light from passing from each block 2 to an adjacent block so as to prevent "optical cross talk" which would be disadvantageous, for instance when the light source 1 is used in an autostereoscopic 3D display.

It is desirable for variations in light output from the blocks 2 to be minimised. Cold cathode florescent tubes provide high brightness and efficiency with fast switching speeds but exhibit brightness variations because of their long warm-up time, which can amount to several minutes. As a result, there will be brightness differences between those tubes which have recently been switched on and those tubes which have been recently switched off. A heater pad 8 provided with a suitable temperature controller (not shown) is therefore disposed adjacent the florescent tubes 4 so as to maintain the temperatures of all of the tubes 4 at their normal operating temperature, which is typically about 55° C. Thus, tubes which have been switched off for a substantial time will emit substantially their full intensity immediately on being switched on.

Figure 3:
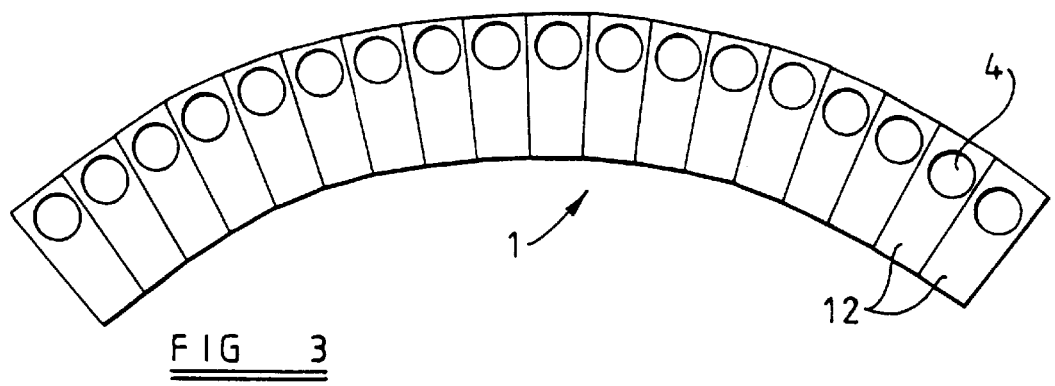
FIG. 3 shows a light source constituting a second embodiment of the invention.
Figure 4:
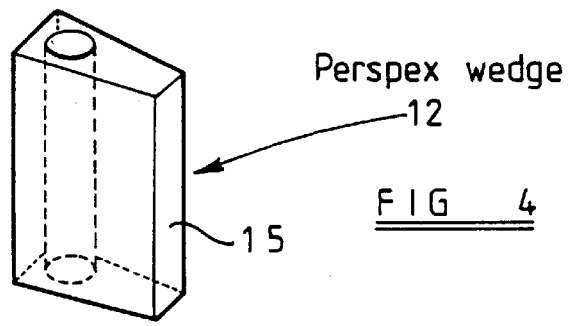
FIG. 4 shows part of the light source of FIG. 3 in more detail.

FIGS. 3 and 4 show a modified form of light source 1 in which the cuboidal blocks 2 are replaced by wedge-shaped blocks 12. The surfaces 15 correspond to the diffusing surfaces 5 of the blocks 2 and provide the light output of the blocks 12. The remaining surfaces are coated with reflective material as in the case of the blocks 2. It is thus possible to provide a curved one dimensional light source in which the surfaces 15 of the wedge blocks 12 form or approximate part of a cylindrical or spherical surface. The surfaces 15 may be narrower than the width of the tubes 4 so as to increase the spatial resolution of the light source. Such a curved light source may be useful in overcoming field curvature aberration, for instance associated with off-axis performance of Fresnel lenses used in 3D display systems, thus increasing the field of view of such a display.

Figure 5:
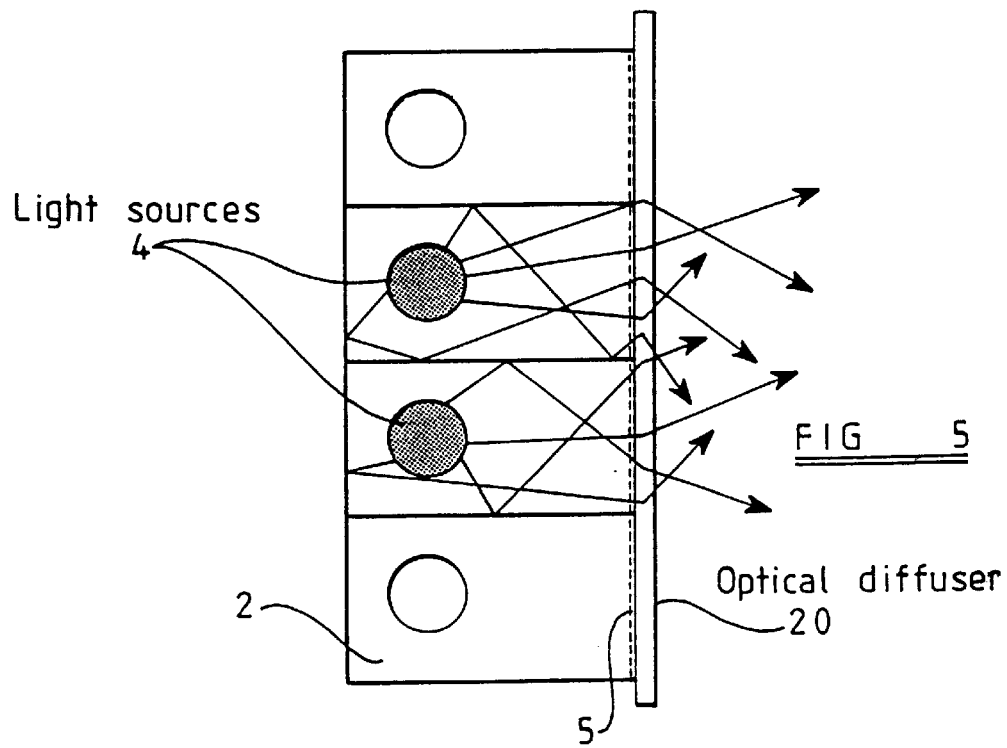
FIG. 5 shows part of the light source of FIG. 1 with the addition of an optical diffuser.

In many applications such as autostereoscopic 3D displays, it is important for any residual gap between adjacent surfaces 5 or 15 of the blocks to be substantially invisible to the viewer. This may be at least partly achieved by carefully machining the blocks to have sharp edges at the surfaces 5 and 15 which are pressed together with only a thin reflective film separating adjacent blocks. However, in order to reduce the visibility of the gaps still further, an additional thin diffuser 20 may be disposed across the surfaces 5 of the blocks so as to allow a small amount of controlled cross-diffusion of light between adjacent blocks, as shown in FIG. 5. In addition, a layer of 3M Brightness Enhancing Film (BEF) may be used on the surface of the diffuser 20 to enhance the brightness of the source in the normal direction.

Figure 6:
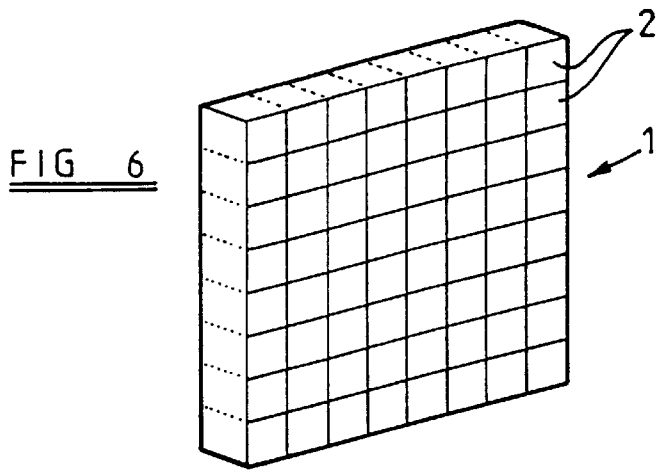
FIG. 6 shows a light source constituting a third embodiment of the invention.

FIG. 6 shows a two dimensional light source 1 comprising a plurality of blocks 2 arranged as a two dimensional contiguous array. The light sources of the individual blocks are independently controllable so as to permit any pattern of illumination to be provided. For instance, associated control circuitry may be arranged to illuminate one block at a time so that all of the blocks are illuminated in a repeating sequence. Such a light source may, for instance, be used in a 3D display to provide both vertical and horizontal parallax.

Figure 2:
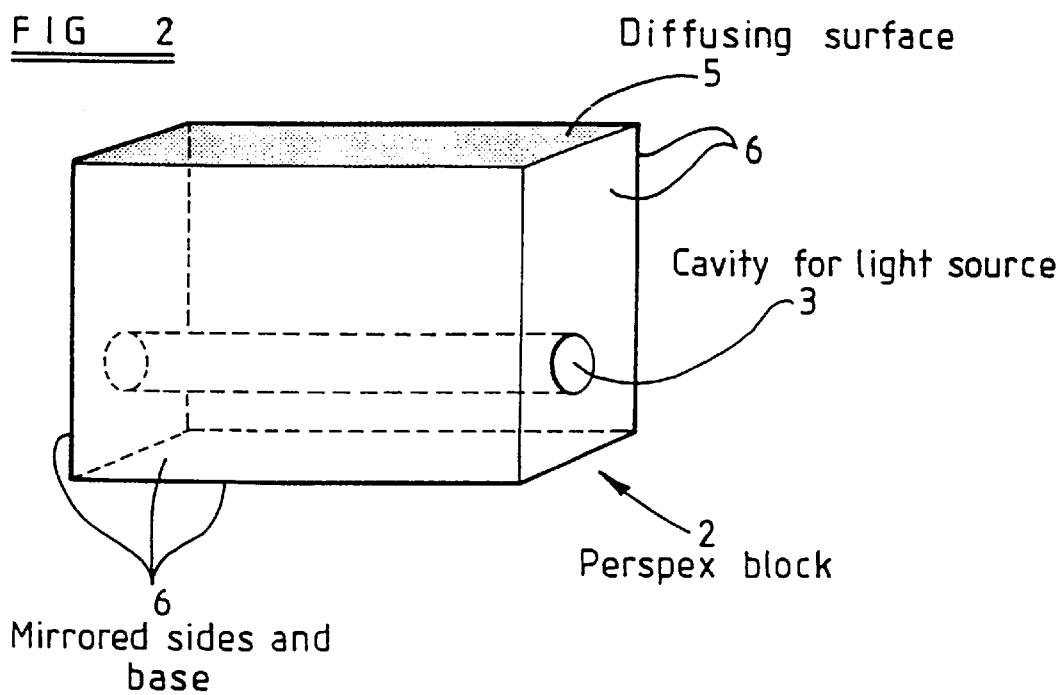
FIG. 2 shows part of the light source of FIG. 1 in more detail.
Figure 7:
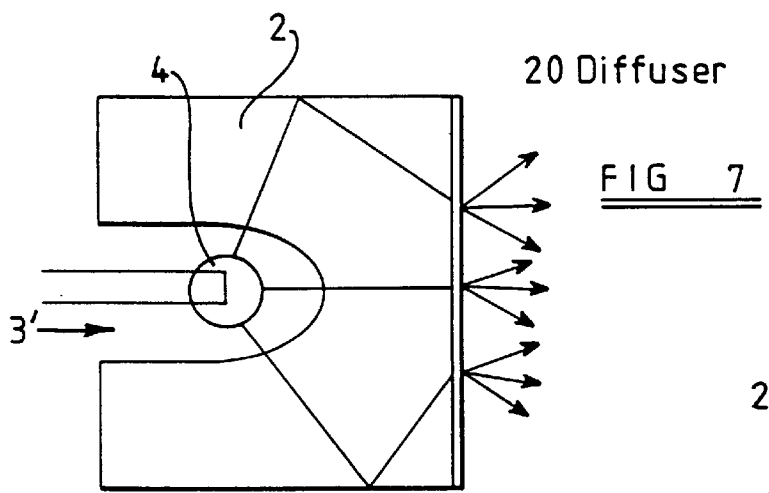
FIG. 7 shows part of a light source, for instance of the type shown in FIG. 6.

FIG. 7 illustrates a modified type of block 2 in which the fluorescent tube 4 is located within a slot 3', extending inwardly from the rear surface of the block 2, instead of in the cylindrical cavity 3 shown in FIG. 2. The surface defining the slot 3' is optically transmissive so that light from the fluorescent tube 4 is coupled into the waveguide formed by the block 2.

Figure 8:
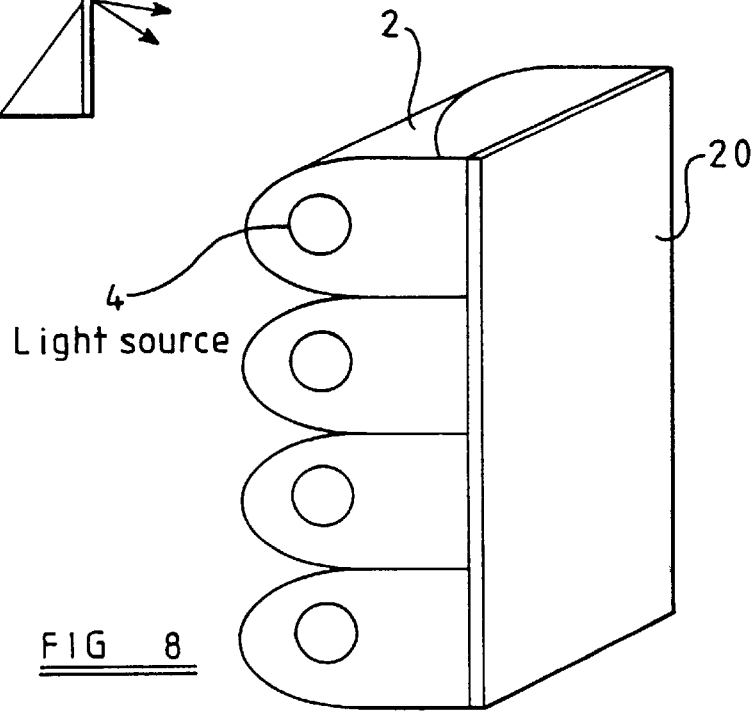
FIG. 8 shows a light source constituting a fourth embodiment of the invention.

FIG. 8 illustrates a light source formed from blocks 2 which differ from the type shown in FIG. 2 in that the rear surface of each block is curved. Such an arrangement may be used to improve the uniformity of output brightness of the waveguide element.

Figure 9:
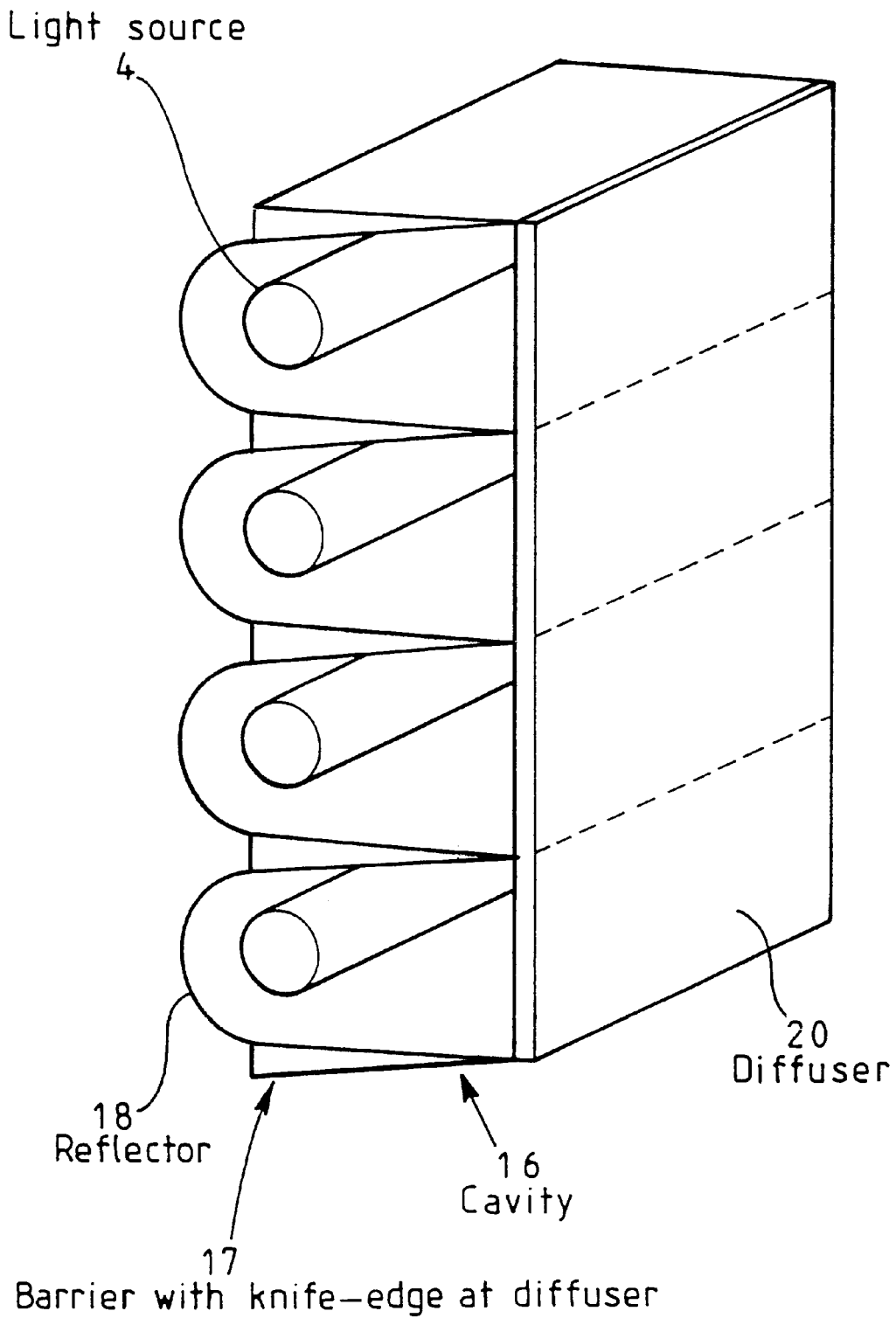
FIG. 9 shows a light source constituting a fifth embodiment of the invention.

The light source shown in FIG. 9 is of a similar configuration to that shown in FIG. 8 but differs in that the essentially solid perspex (RTM) blocks 2 are replaced by "air filled waveguides" enclosing cavities 16. The cavities are defined by opaque barriers 17 having knife-edges at the diffuser 20 and by opaque end barriers (not shown). The barriers have reflective surfaces and the rear of each cavity 16 is defined by a cylindrically or parabolically curved reflector 18.

The perspex blocks 2 and 12 shown in FIGS. 1 to 5 may likewise be replaced by air filled waveguides.

FIG. 10 shows an application of the light source 1 of FIGS. 3 and 4 in a 3D autostereoscopic display of the type disclosed in FIG. 3 of British Patent Application No.9324703.9. The light source 1 supplies light to a beam splitter 22 which transmits substantially half of the light to a mirror 23 and reflects substantially half of the light to a mirror 24. The mirrors 23 and 24 reflect the light through Fresnel lenses 25 and 26 and spatial light modulators 27 and 28, respectively. The light rays modulated by the spatial light modulators 27 and 28 are then combined by a beam combiner 29 such that an image formed on the spatial light modulator 27 is visible to the right eye of an observer and an image formed on the modulator 28 is visible to a left eye of the observer. The Fresnel lenses 25 and 26 form images of the light source 1 at the right and left eye positions, respectively, of the observer.

The individual florescent tubes of the light source 1 are controlled by an illuminator controller 30 which in turn is controlled by an observer tracking system 31. The observer tracking system 31 is arranged to track the position of the observer and to cause the illuminator controller 30 to switch on those florescent tubes which result in images of the surfaces 15 of the corresponding blocks 12 being formed at the positions of the eyes of the observer. For instance, with the observer located at the position 32, the florescent tubes 4a are illuminated and typical ray paths for the light from the corresponding blocks is shown by the continuous lines. When the observer moves to position 33, the observer tracking system 31 detects the change in position and causes the illuminator controller 30 to extinguish the tubes 4a and to light the tubes 4b. Typical ray paths are illustrated by the chain dot lines in FIG. 10.

Alternatively, in order to allow two observers to see autostereoscopic images simultaneously, for instance at the positions 32 and 33, both sets of tubes 4a and 4b may be illuminated simultaneously. The observer tracking system 31 may further be arranged to track the positions of both observers and to cause the illuminator controller 30 to illuminate those tubes 4 which cause autostereoscopic images to be observable by both observers within the range of movement permitted by the display.

FIG. 11 shows another autostereoscopic 3D display which differs from the display shown in FIG. 10 in that the two views making up the autostereoscopic image are provided by temporal multiplexing. With the observer at the position 32, light from the tubes 4c is imaged by a Fresnel lens 35 through a spatial light modulator in the form of a fast liquid crystal device panel 36 at the left eye of the observer (as shown by continuous lines) whereas light from the tubes 4d is imaged at the right eye (as shown by the chain dot lines). When the observer is at the position 33, the tubes 4e and 4f are illuminated. With the observer at the position 32, the tubes 4c are first illuminated and other tubes are switched off. A left eye image is presented to the LCD panel 36 and is seen by the left eye of the observer. The tubes 4c are then extinguished and the tubes 4d are illuminated while the image data have been changed to represent a right eye image which is seen by the right eye of the observer at the position 32. This sequence is repeated with a repetition rate sufficiently high to prevent the visibility of flicker so that the observer sees an autostereoscopic 3D image.

As the observer moves, for instance from the position 32 to the position 33, the active tubes 4 change from 4c and 4d to 4e and 4f continuously so that, within the range of permissible viewing positions, the observer sees the same autostereoscopic 3D image.

Alternatively, as in the case of FIG. 10, two sets of tubes 4c, 4d and 4e, 4f may be active simultaneously so as to permit two observers to see the same autostereoscopic 3D image at different observer locations. For instance, when the observers are at the positions 32 and 33, the tubes 4c and 4e are switched in synchronism and the tubes 4d and 4f are switched in synchronism. Both observers can be independently tracked and the appropriate tubes 4 activated in synchronism with the image data presented to the LCD panel 36.

Figure 12:
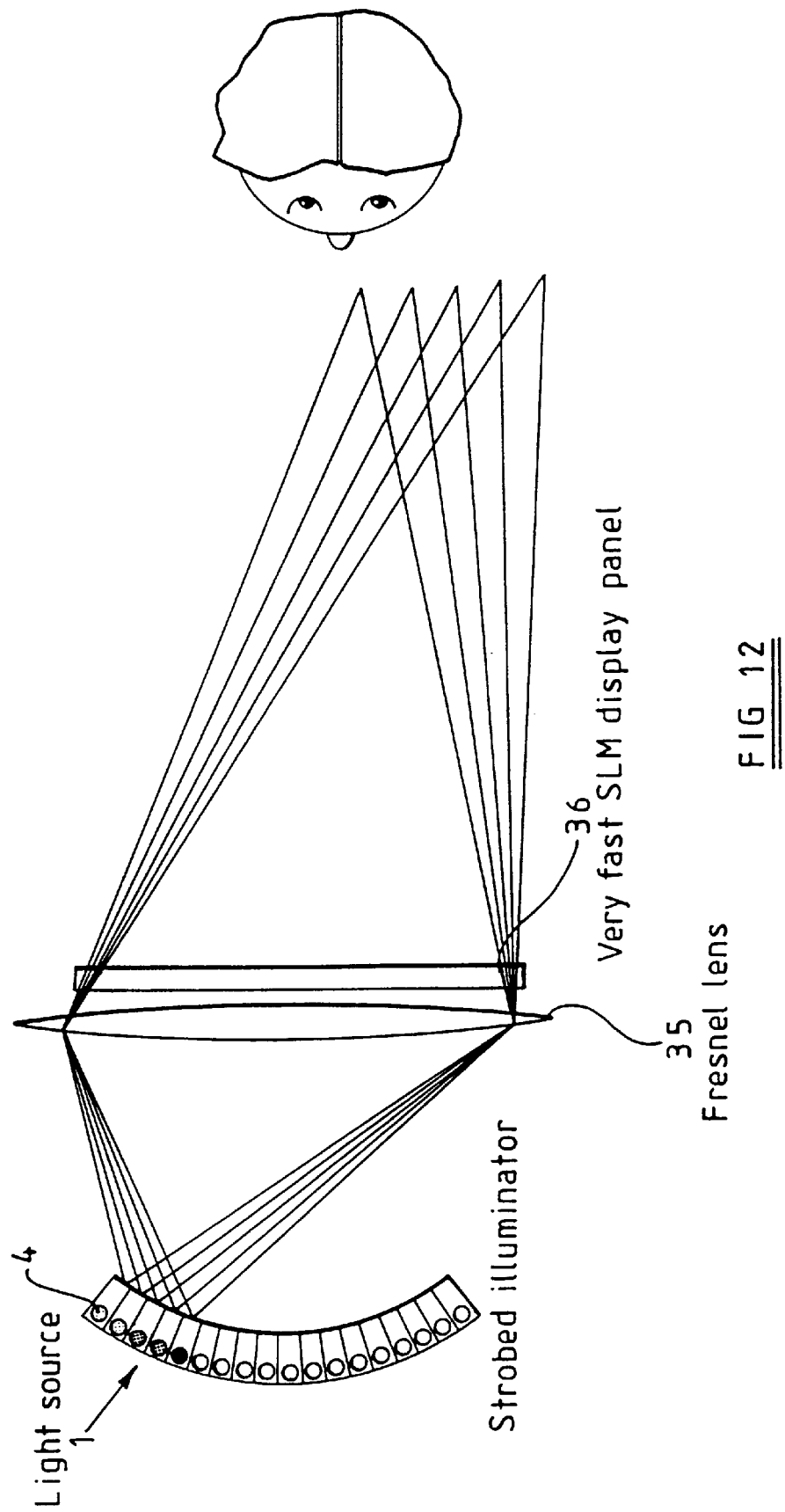
FIG. 12 is a diagram showing a 3D display constituting an eighth embodiment of the invention and including a light source as shown in FIG. 3.

FIG. 12 shows an autostereoscopic 3D display of a type similar to FIG. 11 but in which no tracking of an observer is necessary. In the display of FIG. 12, the panel 36 is a very fast spatial light modulator (SLM) display panel capable of being updated with fresh image data at a very high repetition rate. The individual tubes 4 of the light source 1 are illuminated one at a time in sequence with image data corresponding to a different view being presented to the panel 36 in synchronism with illumination of each respective tube 4. The display therefore provides a large number of views in different directions at a rate sufficient for flicker to be invisible to an observer, so that the observer has a substantial degree of lateral movement within which an autostereoscopic 3D image is visible.

Figure 13:
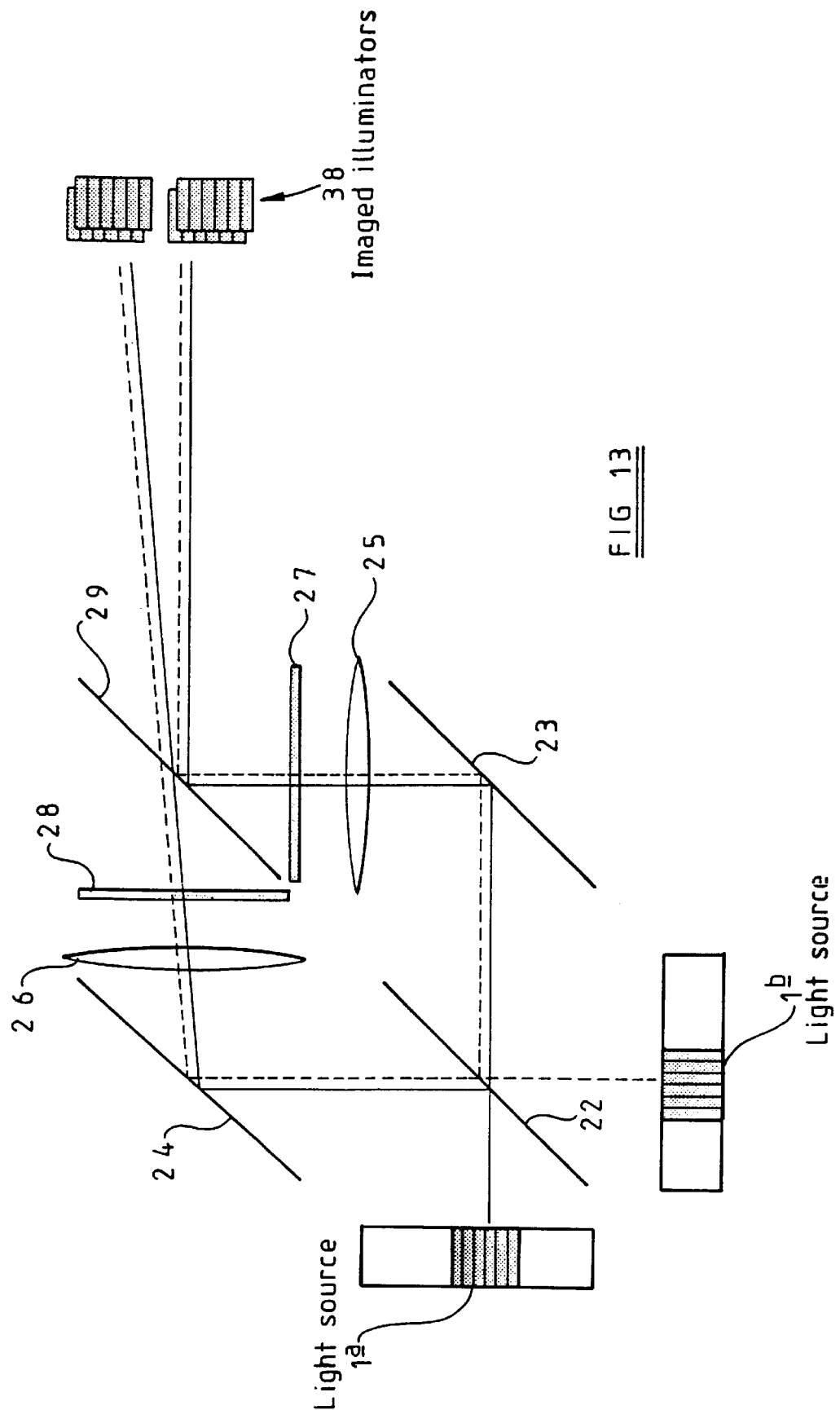
FIG. 13 is a diagram showing a 3D display constituting a ninth embodiment of the invention and including two light sources as shown in FIG. 1.

FIG. 13 shows an autostereoscopic 3D display of a type similar to that shown in FIG. 10 but in which two light sources 1a and 1b are provided. The light from the two light sources 1a and 1b is divided by the beam splitter 22 with the path of light from the source 1a being shown by continuous lines and that from the source 1b shown by broken lines. The light sources 1a and 1b are disposed in positions such that the images, shown at 38, overlap each other by half the pitch of the blocks 2 or 12 of the light sources. Thus, such an arrangement provides a higher light intensity for the display and doubles the effective resolution of the individually illuminatable elements of the light source. Further, any gap between adjacent surfaces 2 or 12 of one light source will be covered by the light from one of the surfaces 2 or 12 of the other light source so that such gaps are less visible.

The tubes 4 of the light sources are individually controllable and may be switched on and off in order to represent any desired type of light source. In the case of a single tracked observer, there are always several tubes 4 in adjacent blocks which are simultaneously illuminated. As an observer moves, for instance to the left as shown by an arrow 39 in FIG. 10, it is necessary for the light source effectively to move in the direction of the arrow 40. This is achieved by switching off the tube at one end of the group of illuminated tubes and switching on the tube adjacent the other end. Thus, as an observer moves, an autostereoscopic 3D image is continuously visible. The light source 1 therefore effectively simulates a movable light source but requires no moving parts. As described hereinbefore, in order for two or more observers to see simultaneously the 3D image, two or more groups of tubes 4 may be simultaneously illuminated or controlled with the illuminated groups tracking the observers independently of each other.

In a typical example of a light source of the type shown in FIG. 1, the fluorescent tubes 4 are 4 mm in diameter and the blocks 2 are 8 mm wide. An array of 24 blocks therefore provides a light source having a total width of 192 mm. When used in a beam combiner display of the type shown in FIG. 10, it is required to produce two images of the light source 64 mm wide separated by 64 mm at the observer. For Fresnel lenses 25 and 26 arranged to provide a magnification of 2:1, four tubes can be illuminated so that the illumination width at the light source is 32 mm. The maximum range of movement of the observer is then 384 mm and the tubes must be switched progressively for approximately each 16 mm of movement of the observer in order to obtain smooth viewing freedom of movement of the observer.

Figure 14:
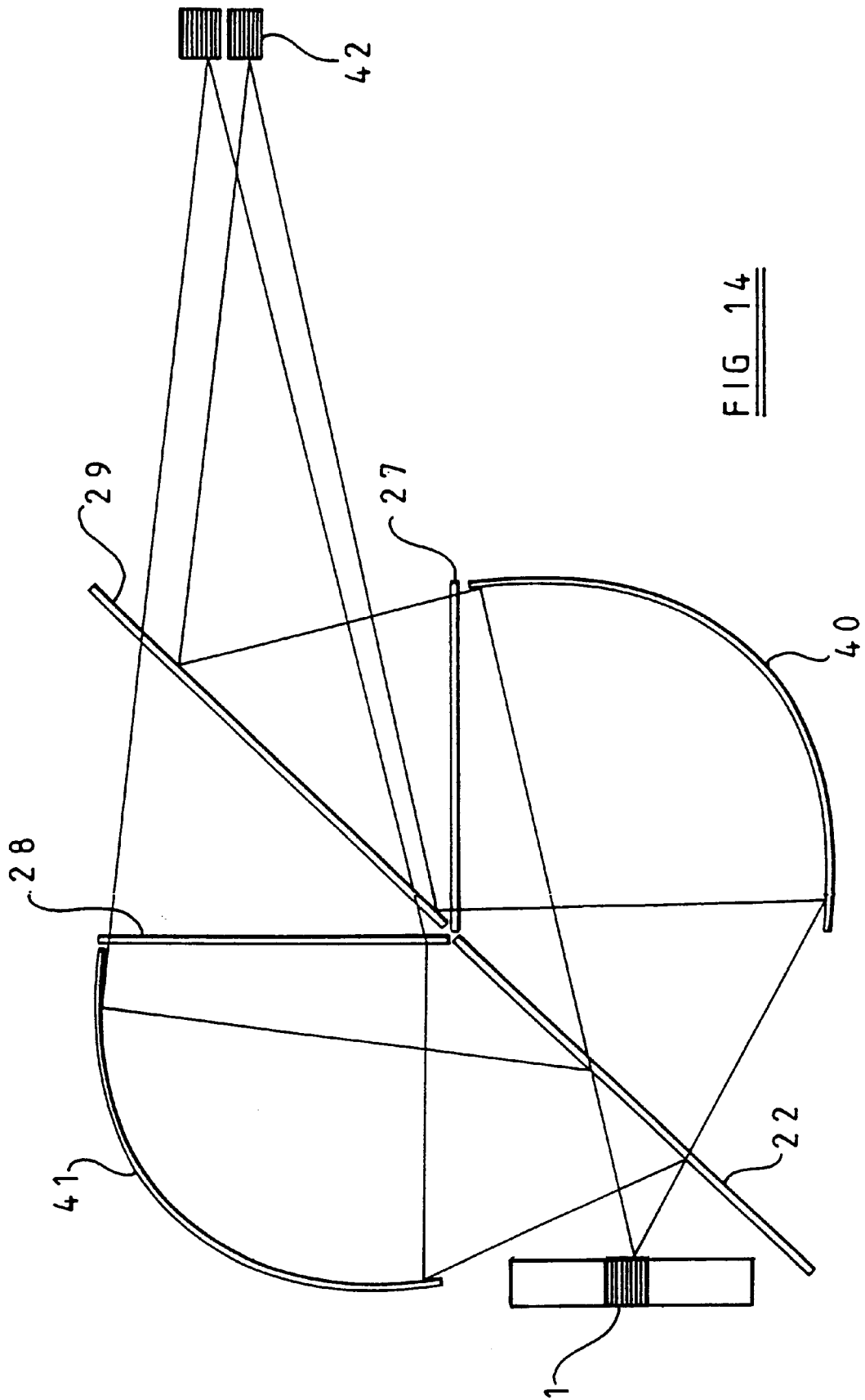
FIG. 14 is a diagram showing a 3D display constituting a tenth embodiment of the invention and including a light source as shown in FIG. 1.

FIG. 14 shows an autostereoscopic 3D display of a type similar to that shown in FIG. 10. However, the mirrors 23 and 24 and the lenses 25 and 26 are replaced by mirrors 40 and 41. Each of the mirrors 40 and 41 comprises a spherical or aspherical mirror which deflects the light from the light source 1 through the corresponding SLM 27 or 28 and forms an image of the light source 1 at an observer location 42. The reflecting surfaces of the mirrors 40 and 41 may additionally incorporate a diffractive pattern so as to produce a hybrid reflective/diffractive element with the focusing power shared between the reflection and the diffraction. This allows an improved optical performance to be obtained together with a larger effective aperture. In addition, the back working distance of the display may be reduced so as to make the display more compact.

Figure 15:
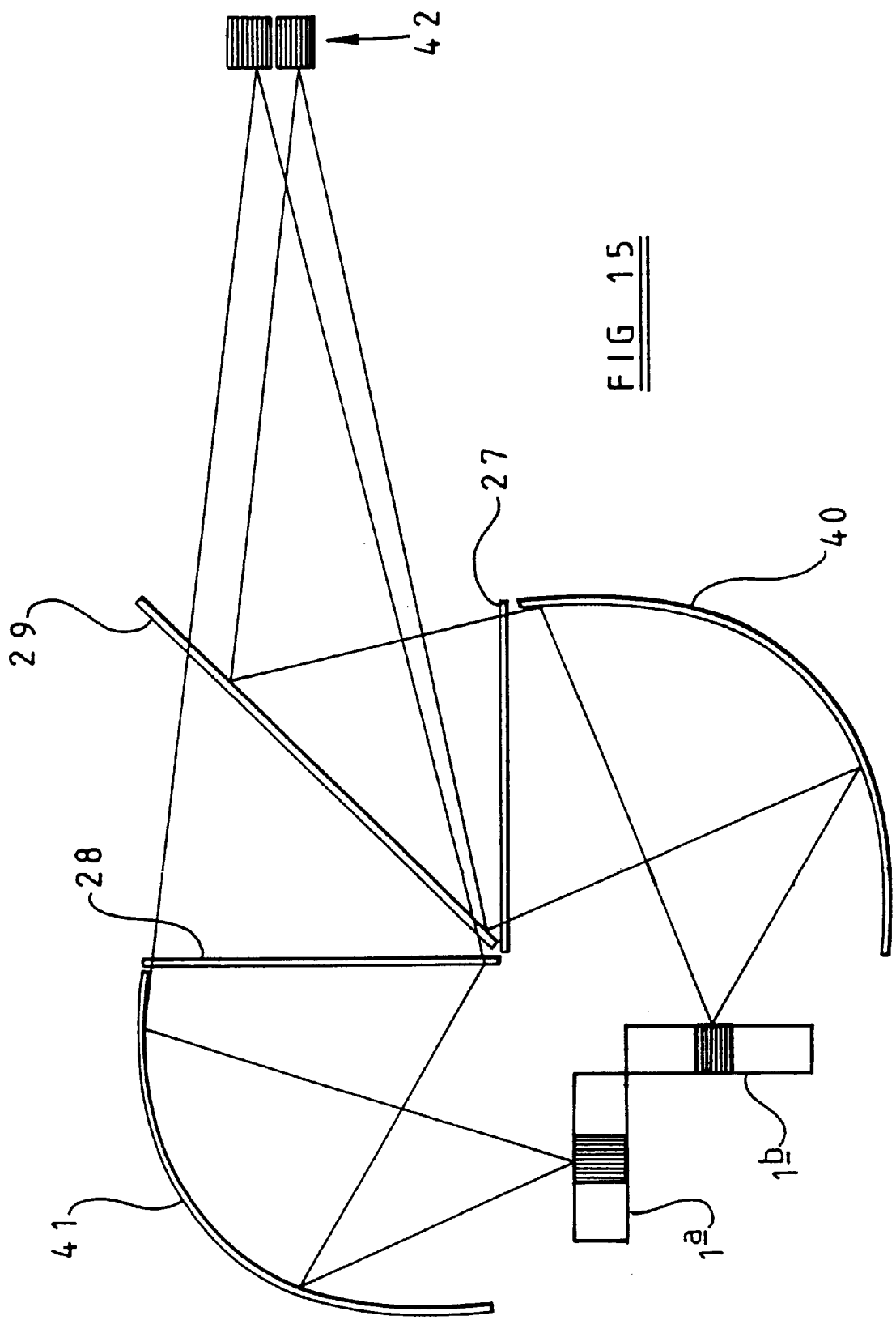
FIG. 15 is a diagram showing a 3D display constituting an eleventh embodiment of the invention and including two light sources as shown in FIG. 1.

FIG. 15 shows an autostereoscopic 3D display similar to that shown in FIG. 14 but in which the light source 1 and the beam splitter 22 are replaced by two light sources 1a and 1b.

Figure 16:
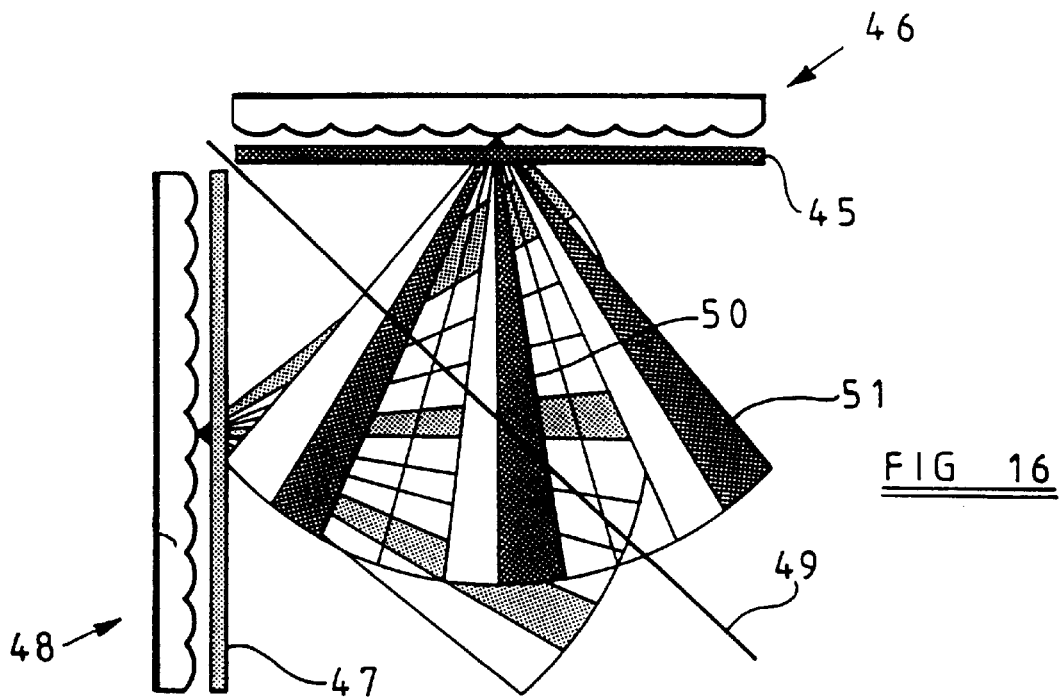
FIG. 16 is a diagram showing a 3D display constituting a twelfth embodiment of the invention.

FIG. 16 shows an autostereoscopic 3D display of a type similar to that shown in FIG. 14 of European Patent Application No.93310071.1. The display comprises a liquid crystal spatial light modulator 45 for modulating light from a light source 46 with an image to be viewed by the left eye of an observer. Similarly, a liquid crystal spatial light modulator 47 is illuminated by a light source 48 and displays an image for viewing by a right eye of the observer. The images are combined by means of a beam combiner 49 such that light from the light source 46 and the spatial light modulator 45 is reflected by the beam combiner 49 whereas light from the light source 48 and the spatial light modulator 47 is transmitted by the beam combiner 49.

Each of the light sources 46 and 48 comprises a lenticular screen behind which is disposed an array of slits and an extended source of illumination. The lenticular screen may alternatively be replaced by a parallax barrier. Each lenticule of each lenticular screen is aligned with a respective slit so as to control the direction of illumination of the spatial light modulator 45 or 47 so that the left and right images are viewable by the left and right eyes, respectively, of an observer located at a viewing region of the display. This region is referred to as the orthoscopic viewing zone.

In order to prevent the generation of pseudoscopic viewing zones i.e. regions in which an observer would see the right image with the left eye and the left image with the right eye, the pitch of the slits may be made greater than twice the width of the slits, i.e. the slit width is less than one third of the lenticular pitch. In a preferred embodiment as shown in FIG. 16, the width of each slit is substantially equal to a quarter of the pitch of the slits. Each lenticule is aligned with a respective slit so that the left image is viewable within a main beam fan 50 whereas the spaces between the slits give rise to a dark region equal to three times the angular extent of the beam fan 50 on either side thereof. On either side of these dark zones, secondary beam fans such as 51 are produced.

Figure 17:
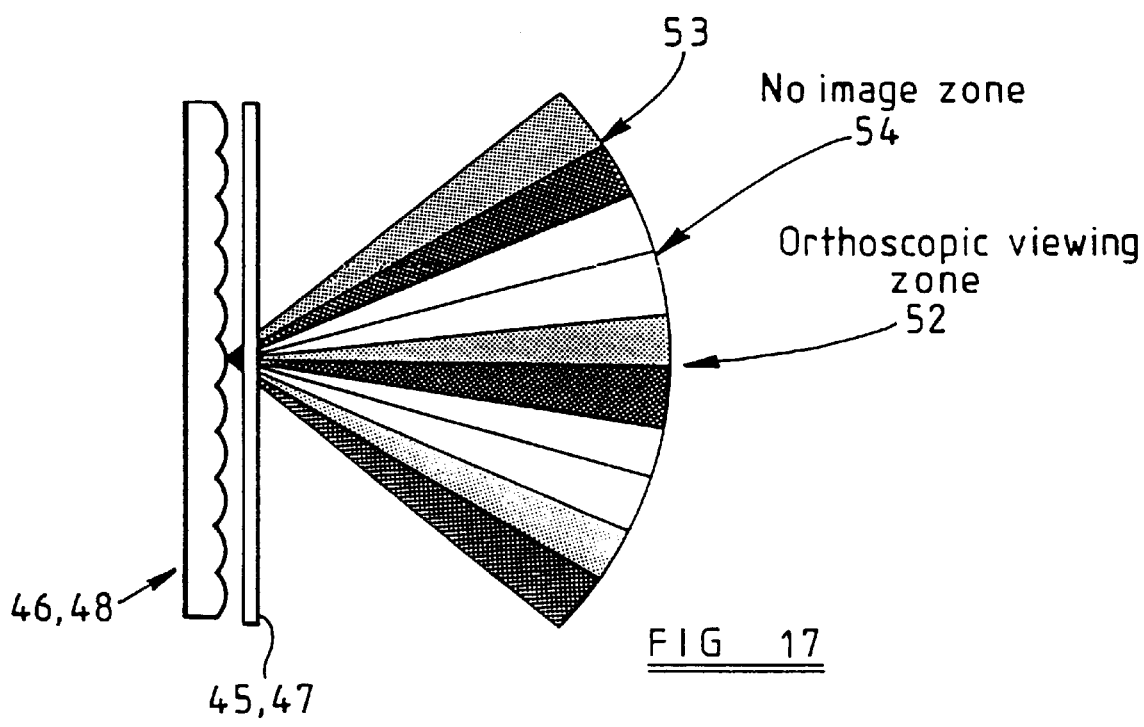
FIG. 17 is a diagram illustrating operation of the display of FIG. 16.

FIG. 17 illustrates the resultant output of the display shown in FIG. 16 after the beams have been combined by the beam combiner 49. There is a main orthoscopic viewing zone 52 in front of the display separated from subsidiary orthoscopic viewing zones such as 53 by dark or "no image" zones 54. Thus, irrespective of the position of an observer, no pseudoscopic viewing zones are generated by the display shown in FIG. 16.

Figure 18A:
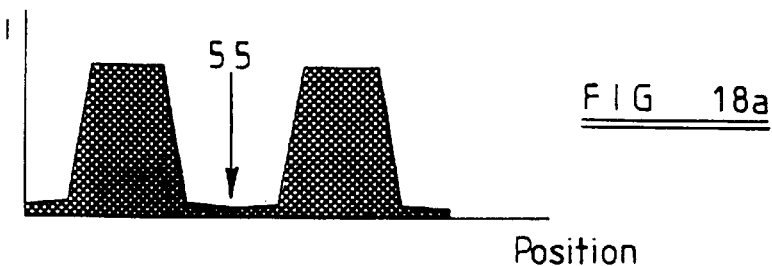
FIGS. 18a to 18c are graphs of light intensity against position illustrating operation of an earlier type of 3D display.
Figure 18B:
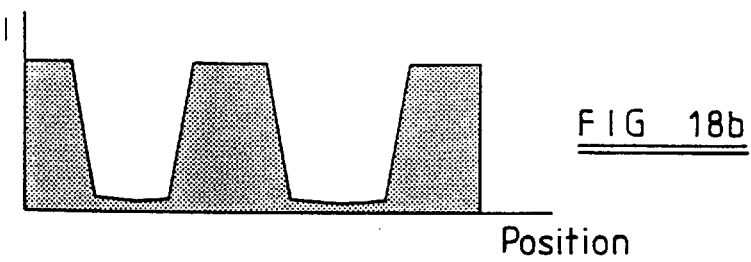
Figure 18C:
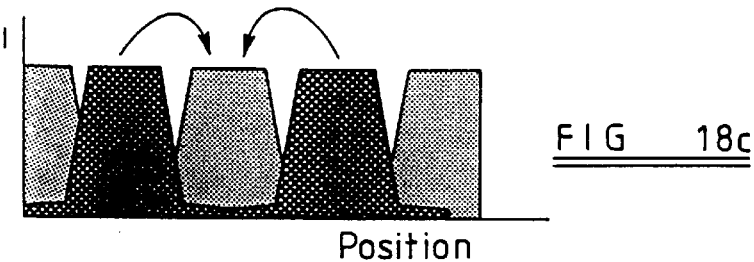

The display shown in FIG. 16 has the further advantage that "cross talk" within the display is reduced. FIGS. 18a to 18c illustrate the effects of cross talk in a display of the type shown in FIG. 14 of European Application No.93310071.1, which is similar to that shown in FIG. 16 of the accompanying drawings but in which the width of the slits is substantially equal to half the pitch of the slits i.e. the width of the slits is substantially equal to the space between the slits. FIGS. 18a and 18b show the intensity profiles of light from the left and right spatial light modulators, respectively. As shown in each of FIGS. 18a and 18b, there is a substantial amount of light spill, for instance as shown at 55 in FIG. 18a. FIG. 18c shows the combined outputs, so that there is substantial light spill and therefore cross talk between the left and right images as seen by the observer.

Figure 19A:
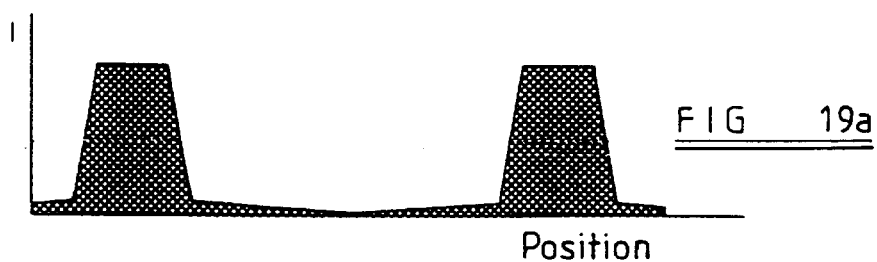
FIGS. 19a to 19c are graphs of light intensity against position illustrating operation of the display of FIG. 16.
Figure 19B:
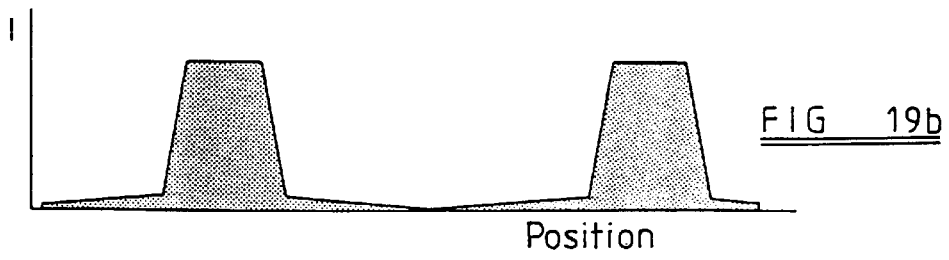
Figure 19C:
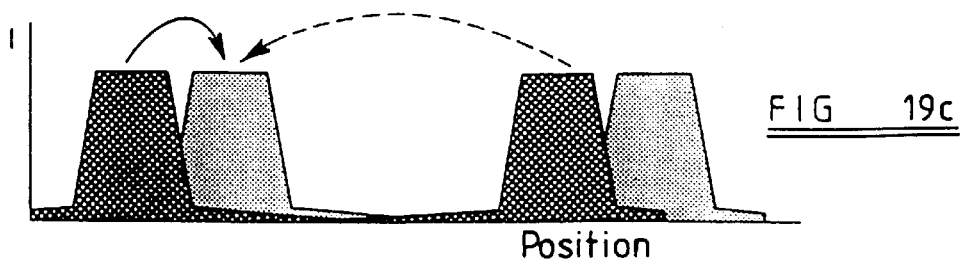

FIG. 19a to 19c correspond to FIGS. 18a to 18c, respectively, for the display of FIG. 16 in which the pitch of the slits is substantially equal to four times the width of the slits. Because of the effectively greater separation of the slits and the light lobes produced thereby, the amount of light spill is greatly reduced. In particular, whereas as shown in FIG. 18c light spills from both sides into each window, light spills from only one side into each window as shown in FIG. 19c. Cross talk between images is therefore greatly reduced.

Figure 20:
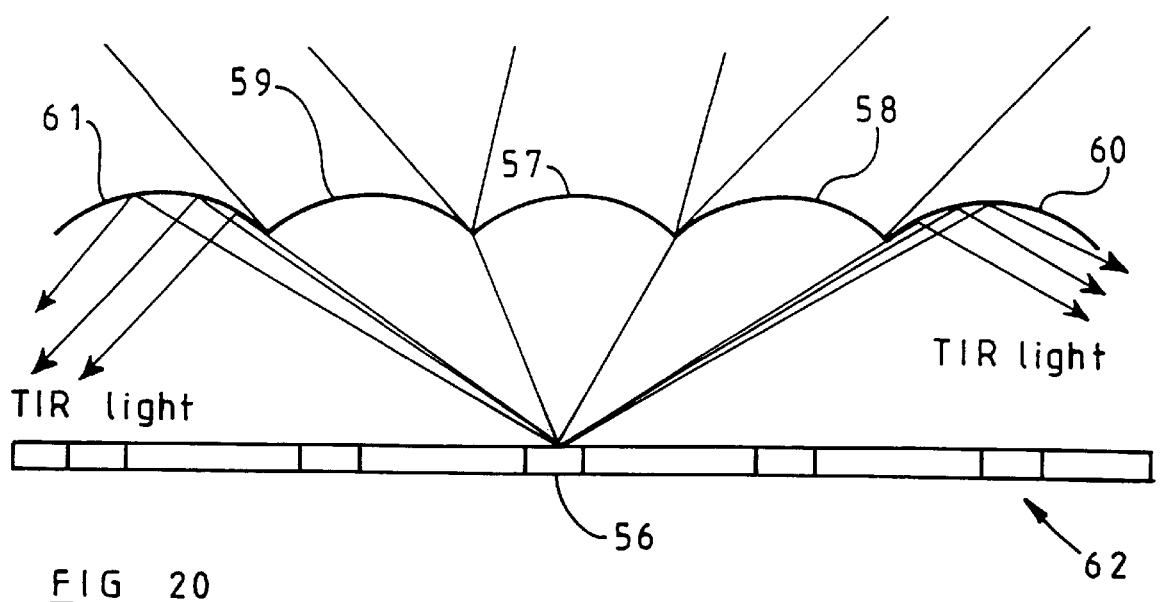
FIG. 20 illustrates a mechanism believed to be at least partly responsible for cross talk in 3D displays.

It is believed that an important mechanism for creating this cross talk is total internal reflection (TIR) of off axis light from the lens surfaces, as shown in FIG. 20. Light from the slit 56 passes through the aligned lenticule 57 and the adjacent lenticules 58 and 59. However, light from the slit 56 directed to the next lenticules 60 and 61 is totally internally reflected from the surfaces of the lenticules back towards the shutter 62 defining the slits. The light is then partially reflected from the opaque areas of the shutter and thus results in the light spill as illustrated in FIGS. 18 and 19.

The effects of TIR may be reduced by various techniques. For instance, the opaque areas of the shutter 62 may be made less reflective. Also, the angular spread of light incident on the shutter 62 may be reduced so as to prevent or reduce the off axis light. This may be achieved, for instance, by using a brightness enhancing film (available from 3M) which converts a Lambertian diffuser output into a more angularly peaked output. Alternatively, venetian blind material may be used.

Another technique for reducing TIR is to arrange a neutral density filter between the lens surfaces and the shutter 62. The required transmitted light will then make a single pass through the neutral density filter whereas the unwanted light will have to make more than one pass and will therefore suffer much greater attenuation. The neutral density filter may comprise a single layer or may be distributed, for instance in the lenticular sheet. Further, an anti-reflection coating may be provided on the surface of the lenticules so as to reduce the range of angles at which TIR occurs.

Figure 21:
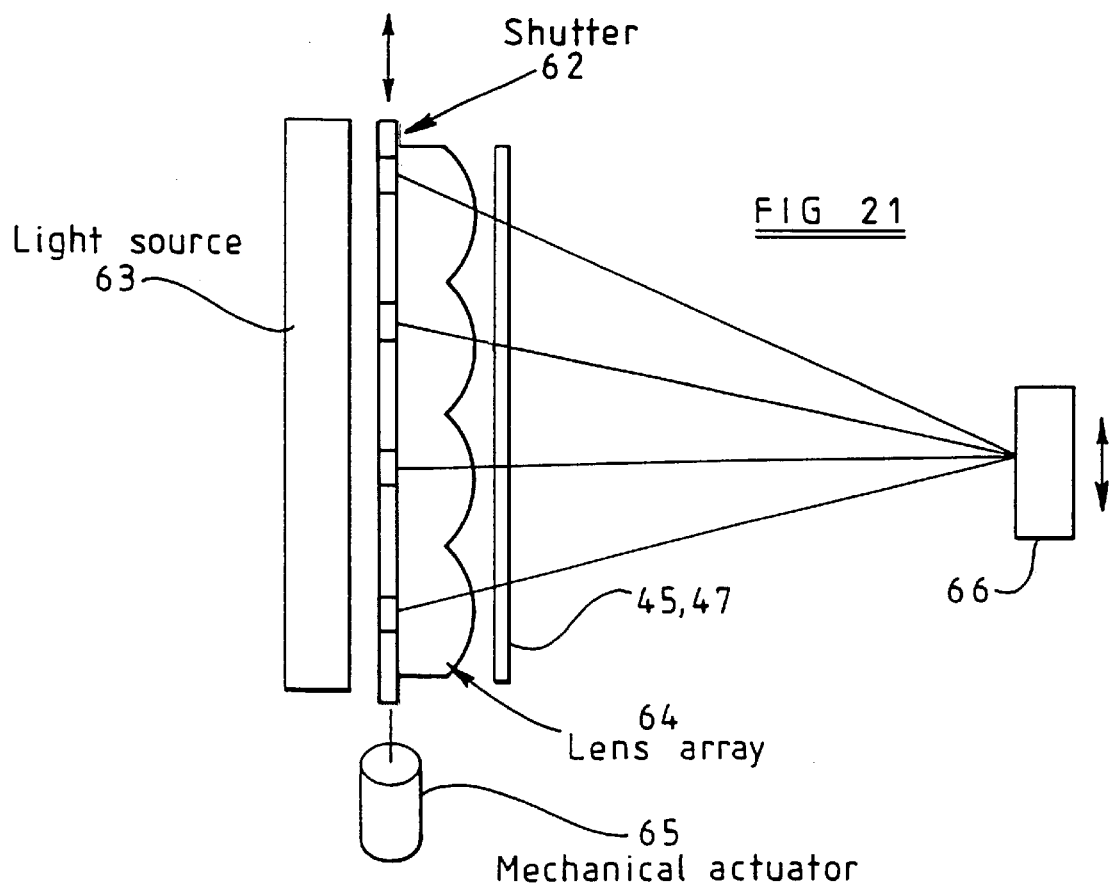
FIG. 21 is a diagram showing part of a 3D display constituting a thirteenth embodiment of the invention.

FIG. 21 illustrates a modification to the type of display shown in FIG. 16 to allow the viewing position of an observer to be tracked. FIG. 21 illustrates one "arm" of the display, the other arm being substantially identical. The shutter 62 is disposed between an extended light source 63 and the lens array 64 and is connected to a mechanical actuator 65. Means (not shown) are provided for tracking the position of an observer 66 and, from this, control signals are supplied to the actuator 65 so as to position the shutter 62 with respect to the lens array 64 so that the observer can see the 3D image.

Figure 22:
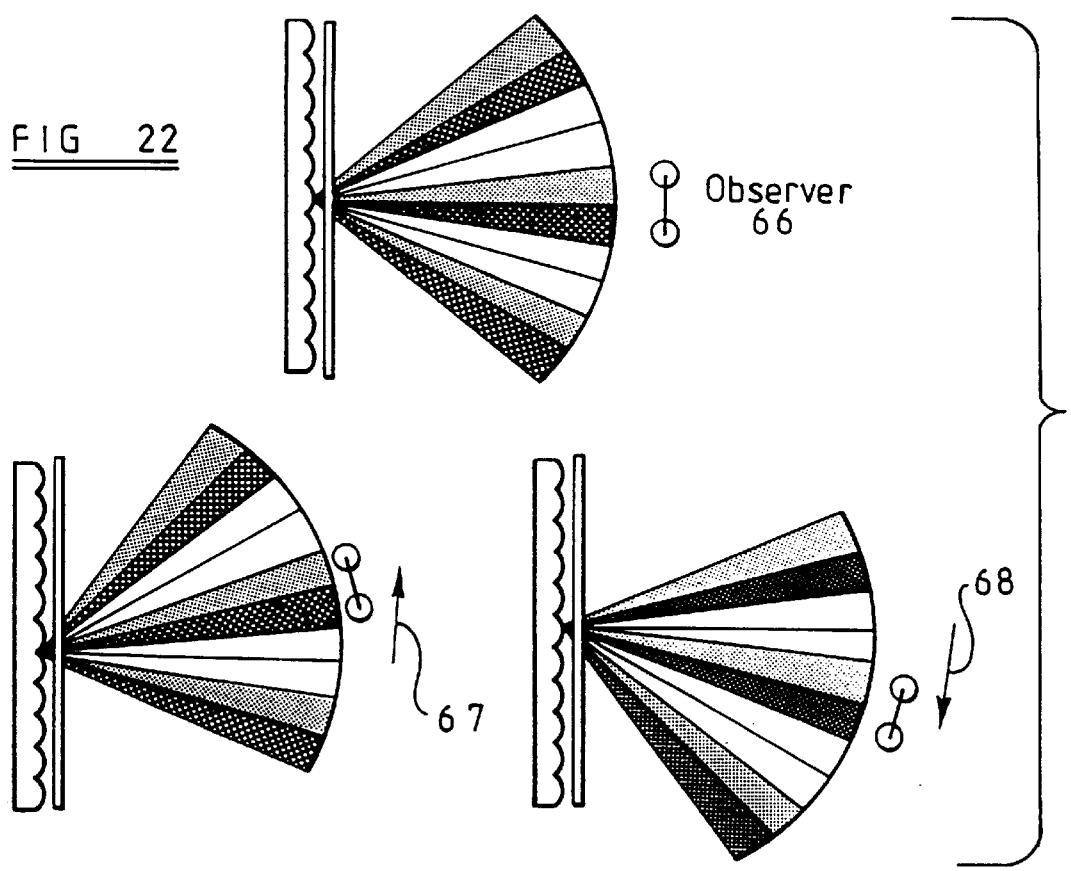
FIG. 22 illustrates operation of the display of FIG. 21 for tracking an observer.

FIG. 22 illustrates the effects of moving the shutter 62 so as to track an observer in the directions of the arrows 67 and 68.

Figure 23:
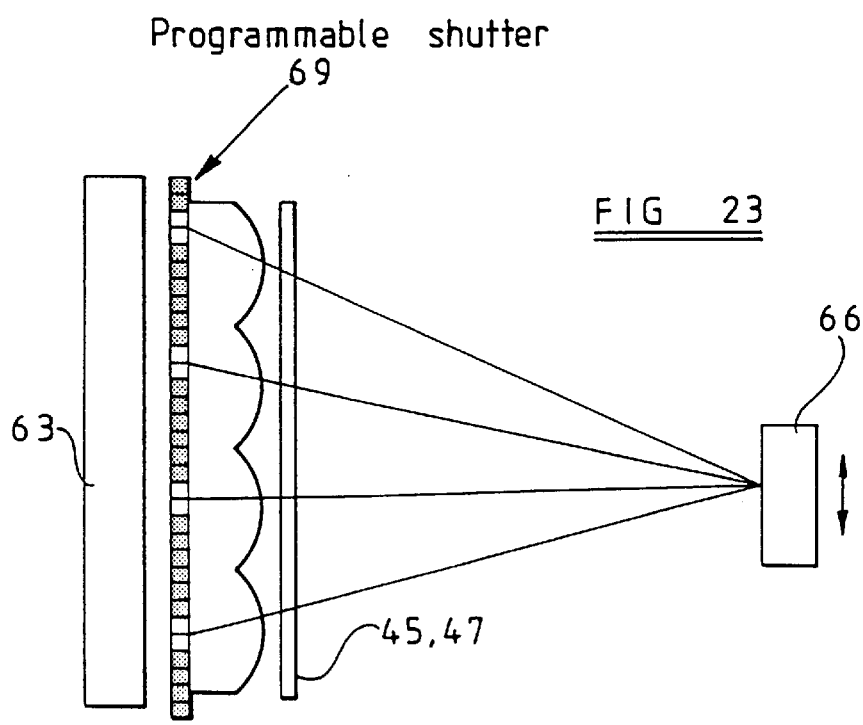
FIG. 23 is a diagram showing part of a 3D display constituting a fourteenth embodiment of the invention.

FIG. 23 illustrates an alternative arrangement for tracking an observer and shows one arm of the display, the other arm being substantially identical. In this display, the mechanically movable shutter 62 and the actuator 65 are replaced by a programmable shutter 69. The programmable shutter 69 may, for instance, comprise a liquid crystal spatial light modulator which is controlled so as to provide transparent slits whose positions are movable so as to track movement of the observer 66.

Figure 24:
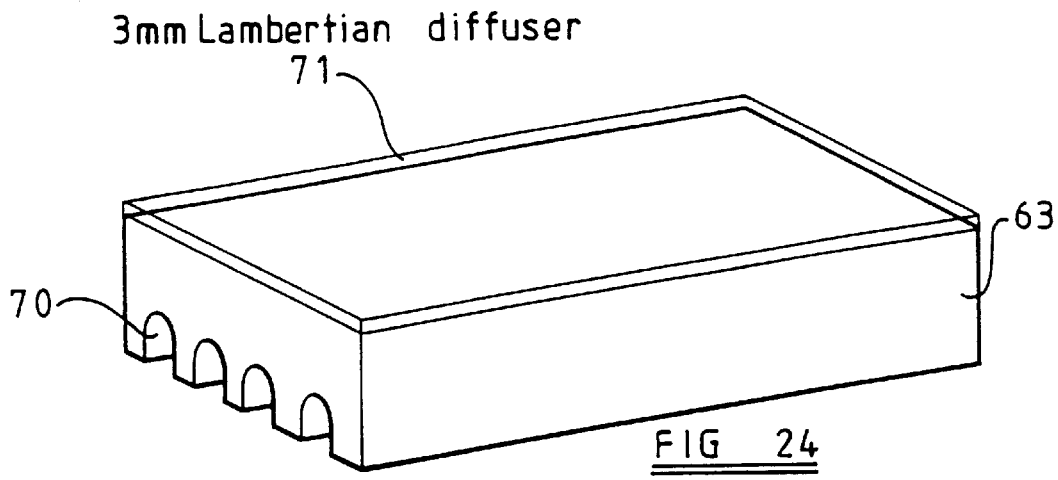
FIGS. 24 to 26 shows examples of extended light sources suitable for use in displays of the types illustrated in FIGS. 16, 17, and 21 to 23.

FIG. 24 shows an example of an extended light source 63 made of a transparent glass or plastics material such as perspex (RTM). Grooves 70 are formed in the block for receiving, for example, 4 mm diameter cold cathode fluorescent tubes. The upper surface of the block 63 is covered with a Lambertian diffuser 71, for instance which is 3 mm thick. The remaining surfaces of the block 63 are made optically reflective, for instance by coating with an optically reflective material, so that the block acts as a light waveguide.

Figure 25:
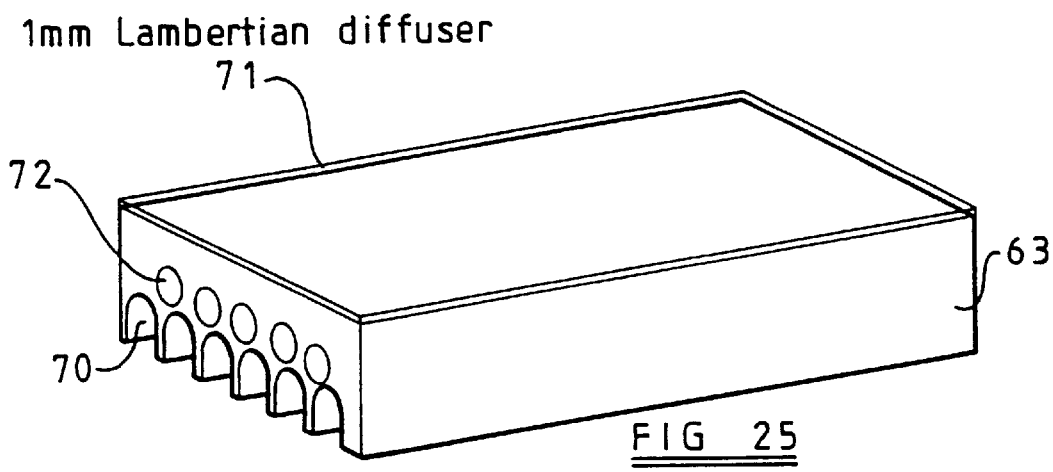
Figure 26:
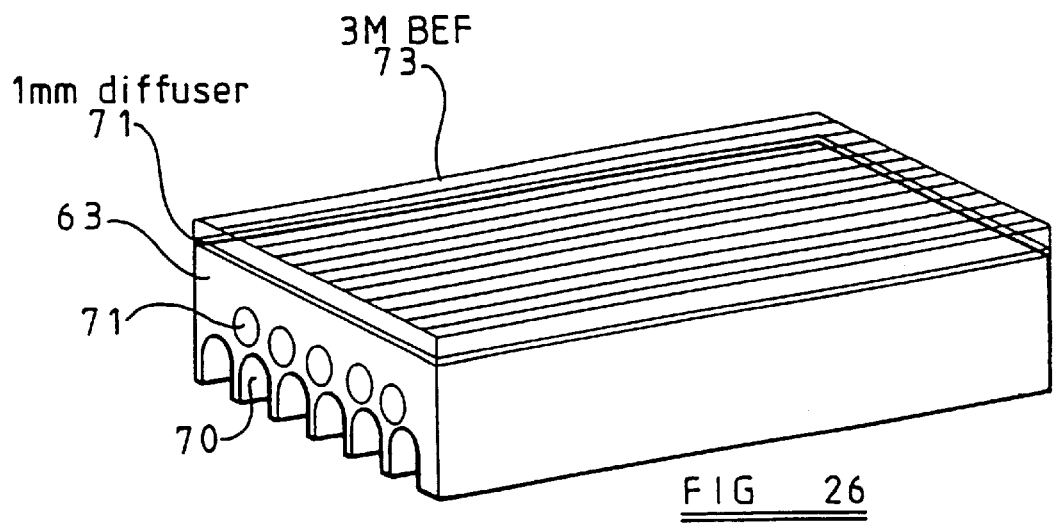

The extended light source shown in FIG. 25 differs from that shown in FIG. 24 in that cylindrical bores 72 are formed therein so as to increase the number of fluorescent tubes. Further, the diffuser 71 is reduced in thickness to 1 mm. Thus, the light output of the light source may be increased. As shown in FIG. 26, the light output of the light source may be increased further by disposing a 3M BEF (brightness enhancing film) 73 over the diffuser 71. Optical gain is provided by the film 73 in one axis only and this can result in changes in brightness with changes in viewing angle. However, the optical gain can be provided in the horizontal axis, where the angular freedom of movement of an observer is relatively small so that brightness variations with movement will not be substantially observable.

The 3D autostereoscopic display shown in FIG. 41 makes use of the illuminators 163 of the type shown in FIGS. 24 to 26 in a display arrangement similar to that shown in FIG. 10. Thus, the observer tracking system, the illuminator controller, and the light source of FIG. 10 are replaced by two fixed illuminators 163 which are illuminated continuously so that two observers 190 and 192 can view the display simultaneously. Similar, a third fixed light source could be added so as to permit a third observer to view the display. Further light sources may be provided, the total number of which is limited by considerations such as compactness, geometry, and optical performance.

Although the fixed illuminators 163 may be continuously illuminated, it is also possible to control which of the fixed illuminators is or are illuminated, for instance by a manually operated switch. Thus, the display may be switchable for the position from which it is viewable or for the number of viewers who may simultaneously view the display.

Although a programmable light source, for instance of the type shown at 1 in FIG. 10, could be used to provide the fixed illuminators 163, problems of light leakage and reflection can result in undesirable visual artifacts. The use of discrete fixed illuminators 163 allows effective screening to be used to separate the illuminators optically so as to avoid or reduce such problems.

In order to reduce the loss of contrast caused by light reflected from the spatial modulators in displays, a neutral density filter may be disposed in front of the spatial light modulator. Light emitted by the display makes a single pass through the filter whereas reflected light makes two passes, namely from the exterior through the filter to the spatial light modulator and back through the filter. Thus, whereas light from the display is attenuated by the filter, reflected light is attenuated twice by the filter and once by reflection at the spatial light modulator. For applications where background levels of lighting are relatively low, the neutral density filter may be movable out of the optical path so that the display may be viewed directly.

The range of eye separation for human observers may vary between approximately 48 mm and approximately 78 mm. 3D displays may need some interocular adjustment in order to compensate for this. For instance, in the case of the display shown in FIG. 10, either or both of the mirrors 23 and 24 may be tilted so as to adjust the interocular distance. In the case of displays where two or more light sources are provided, the size and position of the light sources may be varied so as to provide interocular adjustment. In the case of displays using extended light sources and programmable shutters, for instance as shown in FIG. 23, interocular adjustment may be provided by adjusting the positions of the slits in the programmable shutter of one light source with respect to the other light source.

In general, any technique which alters the angles at which the left and right views are visible may be employed in order to provide interocular adjustment.

3D displays generally contain lenses for focusing or directing light through one or more spatial light modulators. Such lenses may be Fresnel refractive lenses because of their ability to provide large size, light weight, low cost, high numerical aperture, and a degree of compensation for off axis aberrations. Alternatively, lens arrays or lenticular screens may be used for this purpose. Devices of these types may be referred to as "repetitive optical structures".

A typical repetitive optical structure may have a pitch of the same order as that of the picture elements of a liquid crystal device forming the spatial light modulator. When such a repetitive optical structure is disposed adjacent the surface of the SLM, Moire fringes may be observed at a variety of angles corresponding to the lens grooves beating with the regular pixel arrangement. This can cause unwanted visual artifacts in the display.

A Fresnel lens comprises a substrate having formed therein a pattern of grooves. Scattering and non-continuous refraction variations take place at the boundaries of the grooves, resulting in intensity variations across the lens from a particular viewing direction. Such variations generally have a size below the limit of resolution of an observer at a normal viewing distance. However, when such a lens is in close proximity to a SLM such as a liquid crystal device LCD which may have a black mask structure, Moire beating may occur at observable spatial frequencies. In the case of 3D displays provided with observer tracking, it is important to remove the Moire effects because movement of an observer and the consequent tracking can result in a change of the appearance of the fringing, thus highlighting its presence.

FIG. 27 shows an autostereoscopic 3D display in which views provided by spatial light modulators 27 and 28 are combined by a beam combiner 29 to provide an observer with a 3D image. Light sources, for instance of the types 1a and 1b shown in FIG. 13, illuminate the SLMs via Fresnel lenses 25 and 26.

In order to reduce or eliminate Moire fringing effects, the lenses 25 and 26 are separated from the SLMs 27 and 28, respectively, by a distance sufficient to reduce or eliminate the intensity variations caused by the Fresnel lens with respect to the SLM. In particular, the separation is such that several lens grooves are resolved through each pixel of the respective SLM. The lenses 25 and 26 are larger than the SLMs 27 and 28 so that, as an observer moves off axis, some parts of each lens are still visible through the respective SLM.

FIG. 28 illustrates an autostereoscopic 3D display of the type shown in FIG. 16. In this case, the lens arrays or lenticular screens of the light sources 46 and 48 are spaced from the SLMs 45 and 47, respectively, by an amount sufficient to reduce or eliminate Moire fringing effects.

Other means for reducing or eliminating Moire fringing effects may be provided. For instance, there may be provided a large difference between the pitch of the pixels of the SLMs and the groove pitches of the Fresnel lenses. However, this may be difficult to achieve, for instance in spherical type lenses where Moire fringing has to be removed at a number of angles.

Alternatively, a cylindrical Fresnel lens may be used having substantially the same horizontal groove pitch as the pixel pitch of the SLMs.

However, this may be difficult to implement because of the pitch tolerances required for manufacture of the lens.

A further possibility is to vibrate the respective optical structure with respect to the corresponding SLM so that the fringes are temporally blurred so as to be substantially invisible. However, this may be difficult to implement and may cause degradation in the cross talk seen by an observer.

Figure 29:
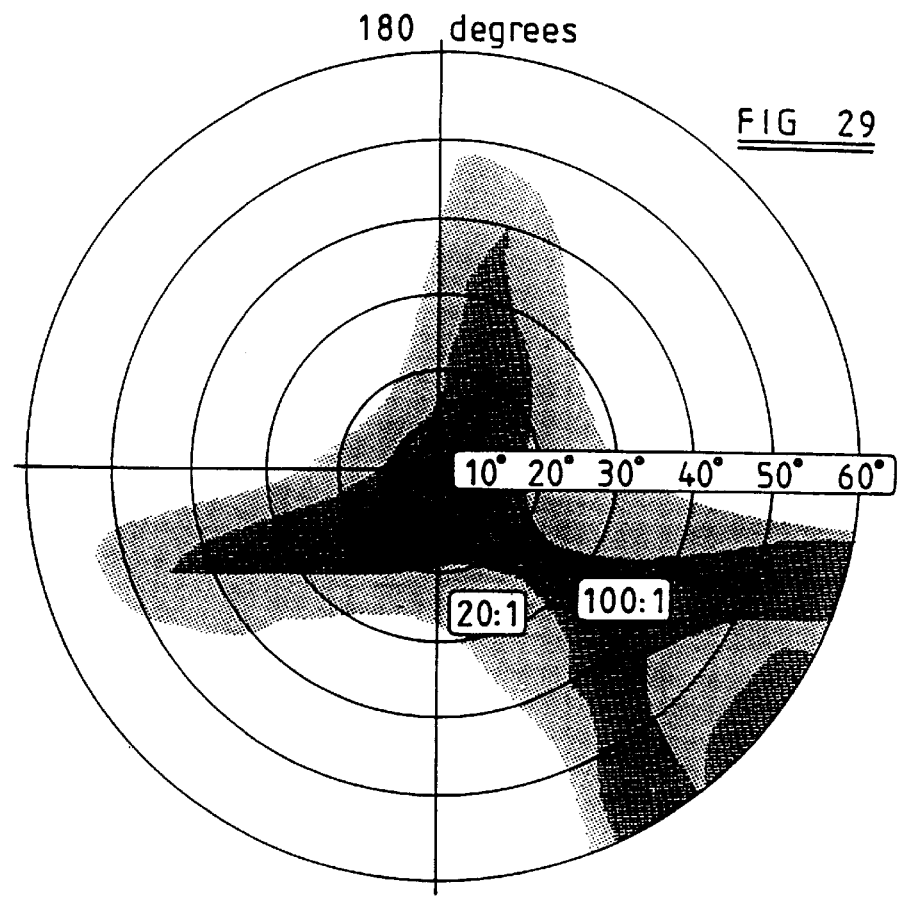
FIG. 29 is an iso contrast viewing diagram for a "normally white" mode of a twisted nematic liquid crystal display.

Many spatial light modulators have a contrast performance which varies asymmetrically with respect to viewing angle about the normal to the plane of the modulator. For instance, spatial light modulators in the form of twisted nematic liquid crystal displays exhibit asymmetric contrast performance with respect to vertical viewing angle. This is illustrated in FIG. 29, which is an iso contrast viewing diagram for the normally white mode of a twisted nematic liquid crystal device and which is based on a diagram in "Liquid Crystals, Applications and Uses", volume 1, chapter 10 "Twisted Nematic and Supertwisted Nematic Mode LCDs", by T. Scheffer and J. Nehring, Ed. B. Brahadur, Pub. World Scientific 1990. The darker shaded area represents those viewing angles for which the maximum contrast is greater than or equal to 100:1 whereas the intermediate shaded areas represent those viewing angles where the contrast is between 20:1 and 100:1. If the best vertical viewing angle zone is above the normal or horizontal axis, the panel is described as a "twelve o'clock panel" as shown in FIG. 30a whereas, if the best viewing zone is below the horizontal axis, the device is described as a "six o'clock panel" as illustrated in FIG. 30b. In general, this corresponds to the direction of the output polariser of the device as illustrated in FIG. 31a for a twelve o'clock panel and in FIG. 31b for a six o'clock panel.

Part of a beam combining display, for instance of the type shown in FIG. 10, is shown in FIG. 32. The outputs of the liquid crystal spatial light modulators 27 and 28 are combined by means of a beam combiner 29. The SLM 28 provides a right view and the SLM 27 provides a left view of a 3D image. FIG. 32 illustrates the directions of polarisation of the polarisers of the SLMs 27 and 28 facing the beam combiner 29. The orientations of the images on the SLMs is the same as for normal operation of the liquid crystal devices but, whereas light is transmitted through the SLM 28 in the usual direction, light is transmitted in a direction opposite the usual direction in the SLM 27. As a result of this, the SLM 28 behaves as a twelve o'clock panel whereas the SLM 27 behaves as a six o'clock panel.

FIG. 33a illustrates the contrast performances of the SLMs 27 and 28 where the grey levels shown in the vertical columns represent contrast levels against vertical position of an observer. The contrast levels thus have a similar value throughout a relatively limited vertical range as indicated at 150. This can cause visual stress and induced Pulfrich effects to an incorrectly positioned observer and is therefore disadvantageous.

Because light from the SLM 27 is reflected by the beam combiner 29, the image it carries is required to be laterally inverted with respect to the image carried by the SLM 28. In the arrangement of FIG. 32, this is achieved by illuminating the SLM 27 in the reverse direction, which gives rise to the mismatched contrast performances.

FIG. 34 shows a display of the type illustrated in FIG. 32 but in which the SLM 27 is illuminated in the usual direction. The image presented by the SLM 27 is electronically laterally inverted so that both SLMs 27 and 28 behave as twelve o'clock panels to a viewer. As shown in FIG. 33b, the contrast performances of the panels with respect to vertical viewing angle are substantially matched so that the disadvantages of the arrangement shown in FIG. 32 are overcome.

As described in British Patent Application No.9324703.9, in which the position of an observer is tracked and the display is adjusted so as to present an autostereoscopic 3D image to the observer within the range of permissible positions, the relative positions of one or more sources of illumination and an imaging device such as a lens are varied so as to track the observer. It is believed desirable to limit the fluctuations of brightness as the observer moves to less than 5%. It is possible to achieve this by providing a source of illumination which is effectively movable and various techniques exist for achieving this. For instance, a light source may be mechanically moved with respect to the lens or lenses. However, such an arrangement may suffer from problems of response speed and may be difficult to implement for relatively large illumination sources.

Another possible technique is the use of a cathode ray tube controlled so as to provide at its screen a movable light emitting region. However, such an arrangement would have to be relatively large particularly for high brightness cathode ray tubes. Further, such tubes generally have a curved output screen which could affect the optical performance.

FIGS. 35a and 35b show an autostereoscopic 3D observer tracking display of the type shown in FIG. 5 of British Patent Application No.9324703.9. The display comprises a SLM in the form of a liquid crystal device 160 associated with a lens 161, such as a converging Fresnel lens. An illumination source 162 comprises an extended light source (not shown) in the form of a back light in front of which is disposed a shutter array 163 in the form of a low resolution liquid crystal spatial light modulator. The shutter array 163 is controlled by means for tracking the position of an observer (not shown).

In use, the shutter array 163 is controlled so that elements 164 and 165 are transparent whereas the other elements of the array 163 are opaque. Thus, the transparent elements 164 and 165 together with the back light comprise a light source which is imaged by the lens 161 to a region 166 at which the left eye 167 of an observer is located. The light from the elements 164 and 165 is modulated by the liquid crystal device 160 so as to present a left image of a 3D image to the left eye 167 of the observer.

The elements 164 and 165 are then controlled so as to be opaque and the elements 168 and 169 are made transparent so as to act as another light source. Light from the elements 168 and 169 is imaged by the lens 161 to a region 170 at which the right eye 171 of the observer is located. The light is modulated by the liquid crystal device 160 in accordance with a second image of the 3D image to be viewed by the right eye 171. This cycle of events is then repeated at a sufficiently rapid rate to make flicker imperceptible to the observer so that the display provides an autostereoscopic 3D image by temporal multiplexing.

FIG. 35b illustrates operation of the display when the observer has moved in the direction of arrow 172. In order to track the observer smoothly and ensure that the observer continues to see an autostereoscopic 3D image, the shutter array elements 173 and 164 are imaged to the left eye 167 whereas the shutter elements 165 and 168 are imaged at the right eye 171. Thus, light from the shutter elements 173 and 164 is modulated by the device 160 with the left image whereas light from the shutter elements 165 and 168 is modulated by the device 160 with the right image. The shutter array 163 and back light thus simulate movement of the source of illumination in the direction of arrow 174 so as to track movement of the observer.

The display shown in FIGS. 36a and 36b is similar to that shown in FIGS. 35a and 35b but using a shutter array 163 of lower resolution. In this case, in FIG. 36a with the eyes 167 and 171 of the observer in the position shown, only the shutter element 175 is imaged by the lens 161 at the left eye 167 whereas the shutter elements 176 and 177 are imaged at the right eye 171. When the observer moves in the direction of the arrow 172 as shown in FIG. 36b, the shutter elements 176 and 178 are controlled so as to provide light imaged at the left eye 167 whereas only the element 176 is controlled to provide light imaged at the right eye 171.

FIGS. 37a and 37b show a display of the type shown in FIGS. 35a and 35b but with the shutter array 163 operated differently such that all of the shutter elements are strobed continuously. In particular, with the observer in the position shown in FIG. 37a, the shutter elements 173 and 180 are operated in synchronism with the shutter elements 168 and 169 whereas the shutter elements 181 and 182 are operated in synchronism with the shutter elements 164 and 165. Such an arrangement helps to reduce storage effects which may be present in certain types of liquid crystal device if switched to one state for a long time, as is likely for shutter elements disposed further away from the axis of the display. In displays where the light sources are themselves switched, such as the sources illustrated in FIGS. 1 to 5, continuous switched operation of all the light sources helps to reduce the effects of lifetime degradation of the brightness of the sources. If more than one observer is present, then different parts of the shutter array 163 may be controlled in the same way for each observer.

FIG. 37b illustrates operation when the observer has moved in the direction of the arrow 172. In this case, the shutter elements 180, 165, 168, and 182 are controlled in synchronism and the remaining shutter elements 173, 164, 169, and 181 are operated in synchronism.

FIGS. 38a and 38b illustrate the mode of operation as illustrated in FIGS. 37a and 37b in the case of a lower resolution shutter array 163 of the type illustrated in FIGS. 36a and 36b. In particular FIGS. 38a and 38b show a compact type time multiplexed display using an array of lenses and using higher resolution shutter elements than those shown in FIGS. 35a to 37b, with a respective group of "illuminators" for each lens. As in the display shown in FIGS. 36a and 36b, the effective illumination elements are of different sizes for the left and right eyes 167 and 161.

FIGS. 39a and 39b show an autostereoscopic 3D display of a type similar to that shown in FIG. 1 of British Patent Application No.9324703.9 but including illumination sources of the type shown in FIGS. 38a and 38b comprising extended light sources (not shown) and shutters 163a and 163b. In this case, light passes through the shutter 163a for the right image whereas light passes through the shutter 163b for the left image. Light is supplied continuously through the shutters 163a and 163b so that the light paths therefrom are modulated by right and left images supplied to liquid crystal spatial light modulators 160a and 160b, respectively. Two converging lens arrays 161a and 161b are provided for imaging the effective light sources at the right and left eyes 171 and 167, respectively. The left and right images are combined by means of a beam combiner 185.

FIG. 39b illustrates the change in operation of the shutters 163a and 163b in response to movement of the observer in the direction of the arrow 172 so that the display tracks the observer movement.

FIGS. 40a and 40b illustrate an autostereoscopic 3D display of the type shown in FIG. 3 of British Patent Application No.9324703.9. This display differs from that shown in FIGS. 39a and 39b in that the two light sources are replaced by a single light source 162 of the type shown in FIGS. 35a and 35b together with a light dividing arrangement comprising a beam splitter 186 and reflectors 187 and 188. Light from the illumination source 162 is divided so as to simulate two light sources imaged at the positions of the left and right eyes 167 and 171, respectively. Again, FIG. 40b illustrates operation as a result of movement of the observer in the direction of the arrow 172.

In displays of the type shown in FIGS. 39a and 39b, light from the light source, and the shutter 163a is transmitted by the beam combiner 185 whereas light from the light source and the shutter 163b is reflected by the beam combiner 185. This can give rise to disturbing colour differences because the reflection and transmission characteristics of the beam combiner 185 may vary in different ways with respect to colour. However, displays of the type shown in FIGS. 40a and 40b do not exhibit this phenomenon. In particular, by making the beam splitter 186 and the beam combiner 185 substantially identical, the light path through the beam splitter 186, via the mirror 187, and reflected by the beam combiner 185 undergoes one transmission and two reflections whereas light reflected by the beam splitter 186 is reflected by the mirror 188 and transmitted by the beam combiner 185 and therefore also undergoes two reflections and one transmission. Thus, light passing along the two optical paths undergoes the same colour mapping and colour differences are therefore reduced or eliminated.

The illumination sources of the embodiments shown in FIGS. 35a to 40b may comprise extended light sources associated with shutters, as described, or contiguous arrays of discrete light sources. In either case, these embodiments allow shutters or light source arrays of relatively low spatial resolution to be used in arrangements which provide observer tracking. For instance light sources of the type shown in FIGS. 1 to 5 having a resolution limited by the size of the fluorescent tubes may nevertheless be used in observer tracking displays.

FIGS. 42a and 42b show an embodiment which is similar to that of FIG. 10, but in which the lenses 25, 26 are arranged so as to be angularly adjustable with respect to the remainder of the display.

In the FIG. 10 embodiment, where the observer is not located on the optical axes of the lenses 25, 26, there is the risk that the aberrational performance of the lenses 25, 26 may result in degradation of the quality of the images of the light source imaged at the observer 'windows'. This will result in display image degradation from increased crosstalk and under-filling of the lens aperture, and limited viewer freedom of movement. The angularly adjustable lenses 25, 26 in the embodiment of FIGS. 42a and 42b permit the lenses 25, 26 to be moved so as to locate each eye of the observer at or close to the optical axes of the lenses 25, 26.

Starting from the position illustrated in FIG. 42a, if the observer moves in the direction of arrow 200 to the position illustrated in FIG. 42b, in order to provide a stereoscopic image to the new location, the original illuminated part of the light source 1 is switched off, and a different part illuminated. As described above, in order to minimise degradation of the quality of the viewing 'windows' at the observer, the lenses 25, 26 are rotated so as to substantially align their optic axes with the new observer position.

The lenses 25, 26 are moved simultaneously by the same amount, thus it is convenient to provide the lenses 25, 26 upon a common rotary stage, using suitable gearing to move the lenses 25, 26. It will be recognised that lens movement is likely to be slow compared to the fast switching light source 1. It is likely, therefore, that although the stereoscopic image will be maintained during tracking, the image may be degraded until the lenses 25, 26 reach the desired position.

It will be recognised that this embodiment has the advantages that relatively fast observer motion and wide viewing angles can be accommodated. Where two or more observers are present, the lenses 25, 26 may be arranged to track one of the observers so that one of the observers sees the improved quality image. Alternatively, the lenses can be moved so that each observer sees images of approximately equal quality. In this case each observer's eyes may be some distance off-axis, each observer seeing an image of approximately equivalent quality.

The lenses 25, 26 may be arranged to move so as to compensate for vertical movement of an observer thus providing the display with a larger vertical viewing freedom. The lenses 25, 26 are conveniently provided behind the SLM's 27, 28 thus there should be little or no evidence of the lens movement to an observer.

FIG. 43 illustrates an embodiment similar to that illustrated in FIG. 11 but in which the lens 33 is angularly adjustable as described above in order to reduce image degradation and obtain a relatively wide freedom of movement. Again, the light source moves in cooperation with the lens rotation to provide greater viewing freedom.

The embodiment illustrated in FIGS. 44a and 44b is similar to that of FIG. 28, the lenticular screens 46, 48 together with the associated parallax barriers being angularly adjustable. It will be recognised that in this embodiment, movement of an observer, for example in the direction indicated by arrow 202, can be followed either by translational movement of the parallax barriers with respect to the associated lenticular screens as described hereinbefore, or alternatively by adjusting the angular position of the lenticular screen/parallax barrier sandwich. FIG. 45 indicates that relative movement of the parallax barrier with respect to the associated lenticular screen results in translation of the window from which the image is intended to be viewed, whereas rotation of the lenticular screen arrangement results in rotary displacement of the viewing window. Of course, a combination of these techniques can be used simultaneously to improve the tracking freedom and speed.

Such a compact illuminator arrangement may be used in conjunction with a fast panel display. The provision of the illuminator behind the respective SLM reduces the visibility of the moving parts to an observer.

What is claimed is:

1. A light source, comprising:
    a plurality of optical waveguides, each optical waveguide comprising a block having a light emitting face from which light is emitted towards an observer, an end face opposite the light emitting face, and two side faces opposing each other and extending between the light emitting face and the end face with a distance between the light emitting face and the end face being greater than a distance between the side faces, wherein the plurality of optical waveguides are positioned adjacent each other such that the side face of one optical waveguide is substantially adjacent the side face of an adjacent optical waveguide, the light emitting faces of the plurality of optical waveguides are substantially contiguous with each other, and the side faces of the plurality of optical waveguides each include a fully optically reflective surface; and the light source further comprises a plurality of individually controllable light emitting means each comprising at least one light emitter, wherein a corresponding one of the individually controllable light emitting means is located proximate the end face of a respective optical waveguide such that the respective optical waveguide receives light only from the individually controllable light emitting means while substantially preventing passage of light from the other light emitting means between adjacent waveguides, and wherein substantially non-collimated light provided from each corresponding individually controllable light emitting means propagates through the respective optical waveguide from the end face towards the light emitting face by interacting with the reflective surfaces, and is emitted as substantially non-collimated light from the light emitting face so as to provide output light across adjacent light emitting faces having a generally uniform profile.

2. A light source as claimed in claim 1, in which the light emitting faces of the optical waveguides are arranged as a one dimensional array.

3. A light source as claimed in claim 1, in which the light emitting faces of the optical waveguides are arranged as a two dimensional array.

4. A light source as claimed in claim 1, in which each of the optical waveguides comprises a block of optically transparent material having a cavity containing the corresponding one of the controllable light emitting means.

5. A light source as claimed in claim 4, in which the light emitting face is optically diffusing.

6. A light source as claimed in claim 4, in which the block is cuboidal and the light emitting faces of the blocks are disposed in a common plane.

7. A light source as claimed in claim 4, in which the block is wedged-shaped and the light emitting faces of the blocks are disposed in a substantially arcuate surface.

8. A light source as claimed in claim 1, in which each of the optical waveguides comprises a cavity defined by at least one opaque barrier.

9. A light source as claimed in claim 8, in which the at least one barrier is optically reflective.

10. A light source as claimed in claim 1, in which a diffuser is disposed in front of the light emitting faces.

11. A light source as claimed in claim 1, in which the plurality of individually controllable light emitting means comprise at least one fluorescent light tube.

12. A light source as claimed in claim 11, comprising a heater for maintaining the at least one fluorescent light tube substantially at normal operating temperature.

13. A three dimensional display including a light source as claimed in claim 1.

14. A light source as claimed in claim 1, wherein the two side faces of each block are generally parallel.

15. A light source as claimed in claim 14, wherein the light emitting face and the end face of each block are generally parallel.

16. A light source as claimed in claim 14, wherein the end face of each block comprises a curved reflector.

17. A light source as claimed in claim 1, wherein the two side faces of each block are generally non-parallel.

18. A light source as claimed in claim 17, wherein the light emitting face and the end face of each block are generally parallel.

19. A light source as claimed in claim 1, wherein each block is formed of a solid material.

20. A light source as claimed in claim 1, wherein each block comprises a cavity defined by the light emitting face, end face and two side faces.

21. A light source as claimed in claim 19, wherein the cavity is filled with air.

* * * * *